United States Patent
Herman et al.

(10) Patent No.: US 9,984,519 B2
(45) Date of Patent: May 29, 2018

(54) METHOD AND SYSTEM FOR OPTICAL USER RECOGNITION

(71) Applicant: Google Inc., Mountain View, CA (US)

(72) Inventors: Kenneth Louis Herman, San Jose, CA (US); Laura Rabb, San Jose, CA (US); Michael Dixon, Sunnyvale, CA (US); Andrea Colaco, Mountain View, CA (US); Ghulam A. Kirmani, Mountain View, CA (US); Casey Mills Davis, Palo Alto, CA (US); Luis Villaran, East Palo Alto, CA (US); Yash Modi, San Mateo, CA (US); Jeffery Theodore Lee, Los Gatos, CA (US); David Hendler Sloo, Menlo Park, CA (US)

(73) Assignee: Google LLC, Mountian View, CA (US)

( * ) Notice: Subject to any disclaimer, the term of this patent is extended or adjusted under 35 U.S.C. 154(b) by 3 days.

(21) Appl. No.: 14/683,243

(22) Filed: Apr. 10, 2015

(65) Prior Publication Data
US 2016/0307382 A1 Oct. 20, 2016

(51) Int. Cl.
*G06K 9/00* (2006.01)
*G07C 9/00* (2006.01)
*G07C 3/00* (2006.01)

(52) U.S. Cl.
CPC ..... *G07C 9/00158* (2013.01); *G06K 9/00348* (2013.01); *G07C 3/00* (2013.01)

(58) Field of Classification Search
CPC .......... G07C 9/00158; G06K 9/00885; G06K 9/00348
See application file for complete search history.

(56) References Cited

U.S. PATENT DOCUMENTS

| | | | |
|---|---|---|---|
| 6,081,269 A | 6/2000 | Quarendon | |
| 6,556,706 B1 * | 4/2003 | Geng | G01S 17/89 382/154 |
| 7,256,899 B1 | 8/2007 | Faul et al. | |

(Continued)

OTHER PUBLICATIONS

Alhwarin, et al., "IR stereo kinect: improving depth images by combining structured light with IR stereo", InPRICAI 2014: Trends in Artificial Intelligence, pp. 409-421. Springer International Publishing, 2014.

(Continued)

*Primary Examiner* — Samir Ahmed
(74) *Attorney, Agent, or Firm* — Morris & Kamlay LLP

(57) ABSTRACT

A method and system for optically detecting a user. A sequence of patterns of radiation reflected from an object in a room may be captured by a device. The patterns of radiation may be infrared radiation emitted from the device. A sequence of variations between the captured sequence of patterns of radiation and the emitted sequence of patterns of radiation may be determined and object characteristics of an object may be determined based upon the sequence of variations. The object characteristics may be a sequence of dimensions of the object and a sequence of locations of the object. The method may determine the first is a user based upon the determined object characteristics and a room profile. The room profile may include a plurality of object characteristics of one or more objects in the room.

22 Claims, 14 Drawing Sheets

(56) References Cited

U.S. PATENT DOCUMENTS

| | | | |
|---|---|---|---|
| 7,349,104 B2* | 3/2008 | Geng | A61B 5/1077 348/E5.029 |
| 7,358,498 B2* | 4/2008 | Geng | G08B 13/19608 250/347 |
| 7,570,785 B2 | 8/2009 | Breed | |
| 7,659,995 B2 | 2/2010 | Knighton et al. | |
| 7,840,031 B2 | 11/2010 | Albertson et al. | |
| 8,050,461 B2 | 11/2011 | Shpunt et al. | |
| 8,150,142 B2 | 4/2012 | Freedman et al. | |
| 8,249,334 B2 | 8/2012 | Berliner et al. | |
| 8,350,847 B2 | 1/2013 | Shpunt | |
| 8,363,098 B2 | 1/2013 | Rosener et al. | |
| 8,374,397 B2 | 2/2013 | Shpunt et al. | |
| 8,384,997 B2 | 2/2013 | Shpunt et al. | |
| 8,492,696 B2 | 7/2013 | Akerman et al. | |
| 8,493,496 B2 | 7/2013 | Freedman et al. | |
| 8,565,479 B2 | 10/2013 | Gurman et al. | |
| 8,582,867 B2 | 11/2013 | Litvak | |
| 8,594,425 B2 | 11/2013 | Gurman et al. | |
| 8,717,417 B2 | 5/2014 | Sali et al. | |
| 8,749,796 B2 | 6/2014 | Pesach et al. | |
| 8,824,737 B2 | 9/2014 | Gurman et al. | |
| 8,890,809 B2 | 11/2014 | Izumi | |
| 8,934,675 B2 | 1/2015 | Dal Mutto et al. | |
| 9,041,691 B1* | 5/2015 | Haskin | G06F 3/0421 345/175 |
| 9,196,067 B1* | 11/2015 | Freed | G01S 17/89 |
| 2009/0183125 A1 | 7/2009 | Magal et al. | |
| 2010/0020078 A1 | 1/2010 | Shpunt | |
| 2010/0238041 A1 | 9/2010 | Acedo et al. | |
| 2010/0277411 A1 | 11/2010 | Yee et al. | |
| 2011/0268365 A1 | 11/2011 | Lou et al. | |
| 2012/0105326 A1 | 5/2012 | Jeong et al. | |
| 2012/0119988 A1 | 5/2012 | Izumi | |
| 2012/0146902 A1* | 6/2012 | Adermann | G06F 3/017 345/158 |
| 2012/0194516 A1* | 8/2012 | Newcombe | G06T 17/00 345/420 |
| 2012/0194644 A1* | 8/2012 | Newcombe | G06T 7/20 348/46 |
| 2012/0195471 A1* | 8/2012 | Newcombe | G06T 7/2006 382/106 |
| 2012/0196679 A1* | 8/2012 | Newcombe | G06T 7/2046 463/36 |
| 2012/0237086 A1* | 9/2012 | Kourogi | G01C 21/20 382/103 |
| 2012/0327218 A1* | 12/2012 | Baker | H04N 5/23212 348/135 |
| 2013/0014052 A1 | 1/2013 | Frey et al. | |
| 2013/0163853 A1* | 6/2013 | Kwak | G06T 7/0042 382/153 |
| 2013/0255154 A1 | 10/2013 | Kanki et al. | |
| 2013/0265227 A1 | 10/2013 | Julian | |
| 2013/0307775 A1 | 11/2013 | Raynor | |
| 2014/0036235 A1 | 2/2014 | Chang et al. | |
| 2014/0208274 A1 | 7/2014 | Smyth et al. | |
| 2014/0228124 A1* | 8/2014 | Plagge | G08C 23/04 463/39 |
| 2014/0334669 A1 | 11/2014 | Acharya | |

OTHER PUBLICATIONS

Bourlai, "Identifying Humans at Night with Face or Ear Recognition", IDGA (2014).

Gantenbein, "Helping Kinect Recognize Faces", Microsoft Research (2011).

Geng, "Structured-light 3D surface imaging: a tutorial", Advances in Optics and Photonics 3, No. 2 (2011): 128-160.

Henry, et al., "RGB-D mapping: Using depth cameras for dense 3D modeling of indoor environments", In Experimental robotics, pp. 477-491. Springer Berlin Heidelberg, 2014.

Li, "Time-of-Flight Camera—An Introduction", Texas Instruments-Technical White Paper (2014).

Nejad, et al., "Comparison of TOF, FMCW and phase-shift laser range-finding methods by simulation and measurement", Quart. J. Technol. Educ 1 (2006): 11-18.

Salvi, et al., "A state of the art in structured light patterns for surface profilometry", Pattern recognition 43, No. 8 (2010): 2666-2680.

Silberman, et al., "Indoor scene segmentation using a structured light sensor", In Computer Vision Workshops (ICCV Workshops), 2011 IEEE International Conference on, pp. 601-608. IEEE, 2011.

Zhu, et al., "Fusion of time-of-flight depth and stereo for high accuracy depth maps", In Computer Vision and Pattern Recognition, 2008. CVPR 2008. IEEE Conference on, pp. 1-8. IEEE, 2008.

Anonymous: "Kinect Hacking 103: Looking at Kinect IR Patterns", FUTUREPICTURE, Retrieved from the Internet: URL:http://www.futurepicture.org/?p=116 (Nov. 17, 2010).

Communication pursuant to Rule 62a(1) EPC, dated Aug. 8, 2016 in European Patent Application No. 16164282.2.

Eiji Hayashi et al: "Wave to me: User Identification Using Body Lengths and Natural Gestures", Human Factors in Computing Systems, ACM, pp. 3453-3462 (Apr. 26, 2014).

Extended European Search Report dated Dec. 7, 2016 dated in Application No. 16164282.2.

* cited by examiner

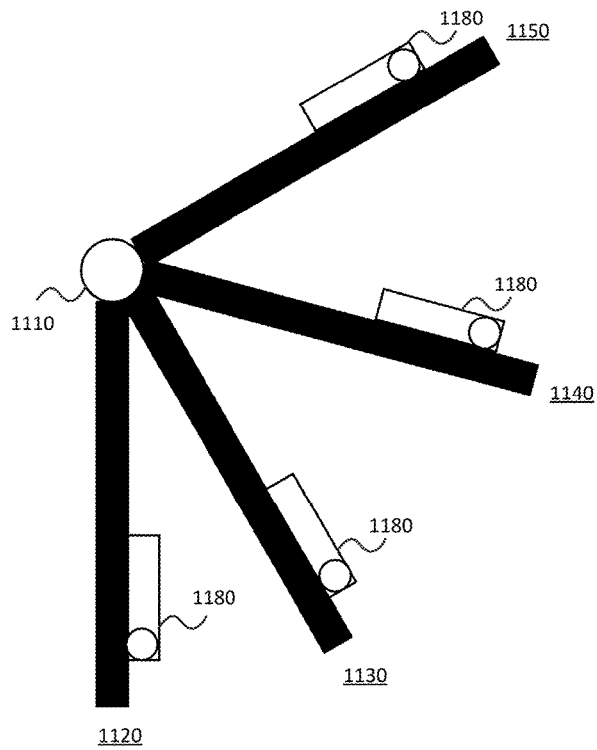
FIG. 11A
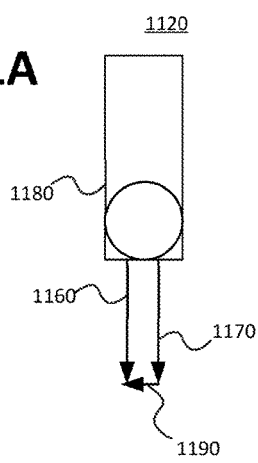
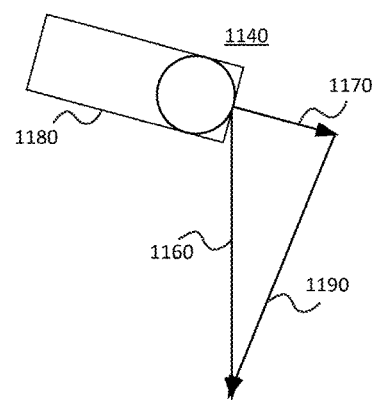
FIG. 11B

METHOD AND SYSTEM FOR OPTICAL USER RECOGNITION

BACKGROUND

Certain premises management systems such as security systems can be difficult for occupants to access under certain circumstances. For example, a security system may have a setting that activates an alarm if someone enters the home and does not deactivate the system with a passcode within a certain time period. However, in some situations it may be difficult for the person to enter the passcode within the set time. For example, when an occupant comes home from shopping, he may have his arms full of bags and boxes that hinder his ability to access the security system. This can result in the activation of an alarm when none is justified. On the other hand, other premises management systems, such as temperature control systems, can be too easily accessed by certain occupants. For example many conventional thermostats are easily accessible by children, and if access to such systems is controlled, it is frequently through a cumbersome login and password process. This results in either undesirable manipulation of the temperature or the administrative burden of repeatedly submitting a credentials in order to adjust the air conditioning.

BRIEF SUMMARY

According to an embodiment of the disclosed subject matter, a method may capture, at a device, a sequence of patterns of radiation reflected from an object in a room. The method may determine a sequence of variations between the captured sequence of patterns of radiation and an emitted sequence of patterns of radiation and determine object characteristics of an object based upon the sequence of variations. The object characteristics may be a sequence of dimensions of the object and a sequence of locations of the object. The method may determine the object is a user based upon the determined object characteristics and a room profile, where the room profile may include a plurality of object characteristics of one or more objects in the room.

According to another embodiment of the disclosed subject matter, a method may capture, at a first device, a first sequence of patterns of radiation reflected from a first object in a room. The method may determine a first sequence of variations between the captured first sequence of patterns of radiation and an emitted first sequence of patterns of radiation. The method may determine first object characteristics of a first object based upon the first sequence of variations. The first object characteristics may include a first sequence of dimensions of the first object and a first sequence of locations of the first object. The method may determine the first object is a user based upon the determined first object characteristics of the first object, a room profile, and a user data. The room profile may include a plurality of object characteristics of one or more objects in the room.

According to another embodiment of the disclosed subject matter, a system may include a first device having an image capture component, and a processor in communication with the first device. The processor may be configured to execute instructions for capturing, at the first device, a first sequence of patterns of radiation reflected from a first object in a room, determining a first sequence of variations between the captured first sequence of patterns of radiation and an emitted first sequence of patterns of radiation, and determining first object characteristics of the first object based upon the first sequence of variations. The first object characteristics of the first object may include a first sequence of dimensions of the first object and a first sequence of locations of the first object. Determining the first object is a user may be based upon the determined first object characteristics of the first object, a room profile, and a user data. The room profile may include a plurality of object characteristics of one or more objects in the room.

According to another embodiment of the disclosed subject matter, means for capturing, at a device, a sequence of patterns of radiation reflected from an object in a room, determining a sequence of variations between the captured sequence of patterns of radiation and an emitted sequence of patterns of radiation, and determining object characteristics of an object based upon the sequence of variations. The object characteristics may include a sequence of dimensions of the object and a sequence of locations of the object. Further disclosed are means for determining the object is a user based upon the determined object characteristics and a room profile, where the room profile may include a plurality of object characteristics of one or more objects in the room.

Additional features, advantages, and embodiments of the disclosed subject matter may be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide further understanding of the disclosed subject matter, are incorporated in and constitute a part of this specification. The drawings also illustrate embodiments of the disclosed subject matter, and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 11A shows a sensor according to an embodiment of the disclosed subject matter.

FIG. 11B shows a sensor according to an embodiment of the disclosed subject matter.

DETAILED DESCRIPTION

To address the issues previously described, it may be desirable for premises management system and similar systems to provide for optical recognition of a user. Devices, systems, and techniques as disclosed herein may provide for optical recognition using various measured patterns of radiation. For example, a sensor as disclosed herein may measure variations in one or more types of radiation, such as infrared, heat, radio, and the like. Based upon variations in the measured radiation, a user may be recognized within an area such as a room. Optical recognition of a user can allow for automated and controlled access to premises management systems such as security systems, temperature control systems, hazardous substance detection systems, and other premises management systems, such as those that incorporate intelligent, multi-sensing, network-connected devices, which can integrate seamlessly with each other and/or with a central server or cloud-computing system. Embodiments disclosed herein may be partially or completely incorporated within a "smart home environment" as described in later portions of this disclosure.

Figure 1:
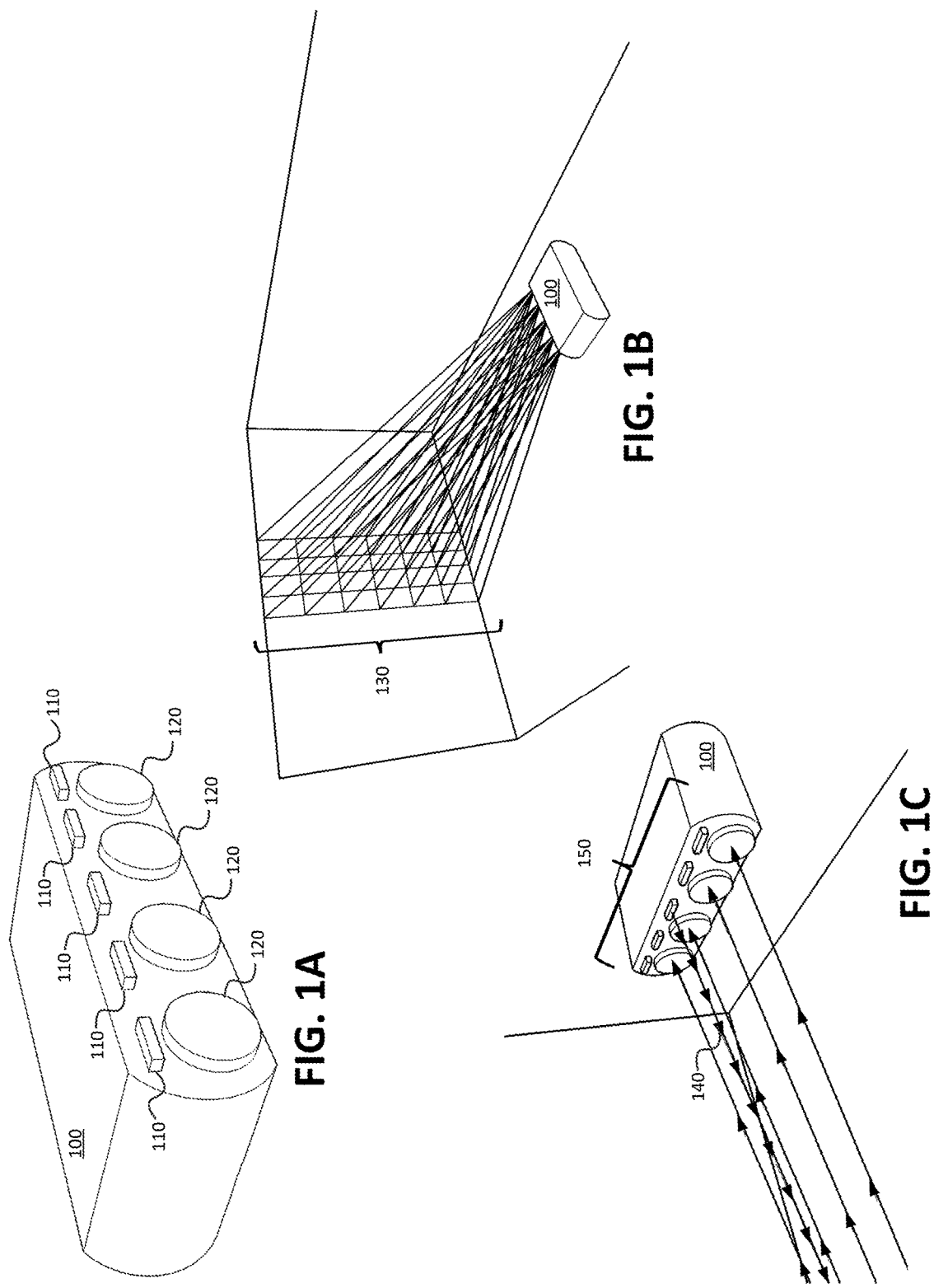
FIG. 1A shows a device for optical user recognition according to an embodiment of the disclosed subject matter.
FIG. 1B shows a device emitting radiation according to an embodiment of the disclosed subject matter.
FIG. 1C shows a device receiving radiation according to an embodiment of the disclosed subject matter.

FIGS. 1A-1C show a device 100 for radiation emission and radiation capture according to an embodiment of this disclosed subject matter. The device may be a stand-alone device, may be incorporated into another device such as a home monitoring hub, or coupled to a network in communication with a premises management system, sensor, or other device. The radiation emitted and captured by the device may visible white light, near-infrared radiation, or infrared radiation. More generally, any suitable electromagnetic radiation may be used. The device may emit radiation from emission components 110. The embodiment depicted shows five emission components; however the device may include a single emission component or any number of emission components suitable for the purposes of this disclosure.

In FIG. 1B the emission components are depicted as infrared light emitting diodes (LEDs), however the type of emission component may be any type of component that emits electromagnetic radiation in a manner suitable for the purposes of this disclosure. For example the emission component may be an LED point source, a laser, or a lens-focused light source such as an incandescent lamp or an organic LED. In certain embodiments non-point sources may also be employed. Radiation may be emitted in a pattern 130 such as a certain arrangement of projected pixels, an arrangement of stripes, a grid, and other structured formats or unstructured radiation formats. For purposes of this disclosure, a pattern may include no more than a single element or a pattern may include multiple elements. For example, the pattern of radiation may be a single projected pixel or beam.

The device may capture radiation through capture components 120. Capture components may be any suitable radiation sensor. For example the capture components may be image sensors such as photodiodes, charge-coupled devices (CCD), complementary metal-oxide-semiconductor (CMOS) devices, red green blue (RGB) imaging cameras, RGB-Depth (RGB-D) imaging cameras, infrared imaging sensors, and other components configured to detect electromagnetic radiation. FIG. 1C shows the device emitting radiation 140 from a single emission component and capturing radiation 140 in each image capture component. However radiation may be emitted from some or all emission components and captured by some or all capture components. The embodiment depicted shows four capture components; however the device may include a single capture component or any number of capture components suitable for the purposes of this disclosure.

Figure 2:
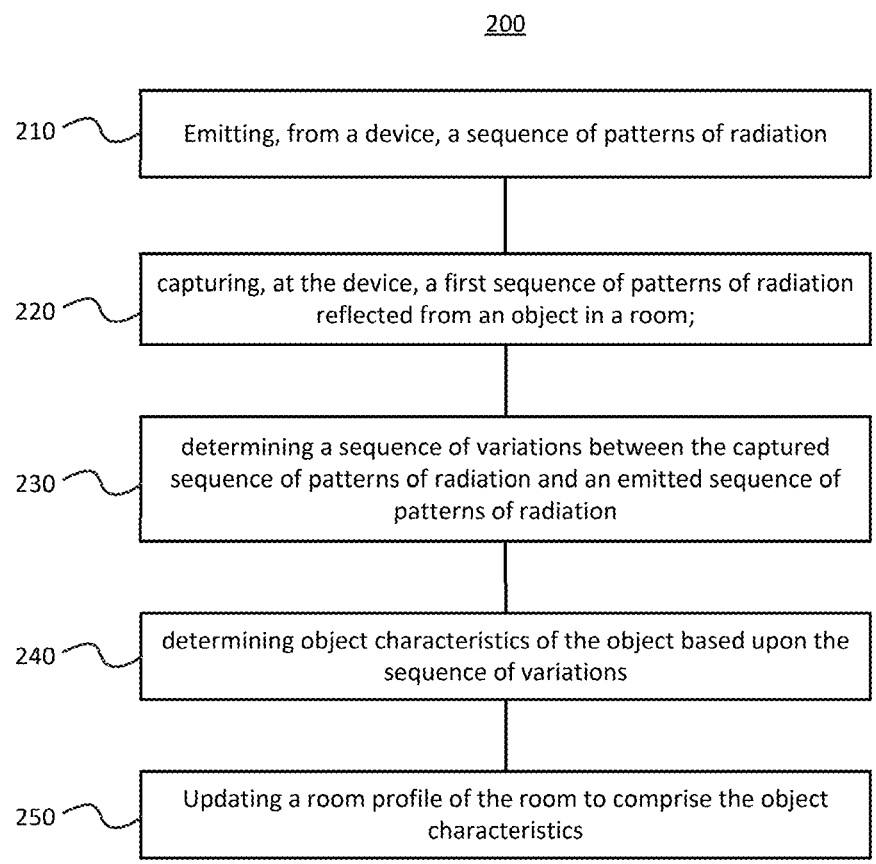
FIG. 2 shows a method for mapping a room according to an embodiment of the disclosed subject matter.

In some cases, a user may be identified within a mapping of a room or other portion of a premises. FIG. 2 shows a method 200 for mapping a room according to an embodiment of the disclosed subject matter. The method may include emitting a sequence of patterns of radiation from a device at 210. As used herein, a sequence of patterns of radiation may contain no more than a single element or a sequence may contain a series of elements. For example, emitting a sequence of patterns of radiation may be an emission of a single pattern for a single instance (e.g. a light pulse), an emission of a single pattern for multiple instances, or it may be an emission of multiple patterns for multiple instances. The patterns of radiation may vary in arrangement within the sequence or they may be constant. The time period between emissions of instances of the sequence of patterns of radiation may be constant or they may vary. The method may further include capturing a sequence of patterns of radiation reflected from an object in a room at 220. The object may be a door, a piece of furniture, a wall of the room, a painting on the wall of the room, a person, a home robot, an animal, a plant, a computer, a television, or anything else that may exist in a room and reflect radiation.

Embodiments disclosed herein may use systems in which a single device may emit radiation and capture the radiation, one device may emit radiation and another device may capture the radiation, multiple devices may emit radiation and one device may capture the radiation, or one device may emit radiation and multiple devices may capture the radiation. Similarly, each such device may only emit, only capture, or both capture and emit radiation. In general, unless explicitly indicated otherwise herein, any combination of emitting and capturing devices may be used.

Method 200 may further include determining a sequence of variations between the captured sequence of patterns of radiation and an emitted sequence of patterns of radiation at 230. Variations may be detected based on techniques such as structured light techniques, stereo techniques, and time-offlight sensing. For example, fixed or programmable structured light techniques may be employed to detect variations in a pattern of radiation such as the dimensional spreading, geometrical skewing, or depth of its elements in order to determine information about an object. An example of such a technique is provided in Geng, Jason, "Structured-light 3D surface imaging: a tutorial." Advances in Optics and Photonics 3, no. 2 (2011): 128-160. In addition, stereo techniques may be employed to detect a variation between the location of an aspect of a pattern of radiation captured in a first capture component and the location of the aspect in a second capture component. This variation may be used to determine depth information of the object from which the pattern is reflected. An example of such a technique is provided in Alhwarin, Faraj, et al., "IR stereo kinect: improving depth images by combining structured light with IR stereo." In *PRICAI* 2014: *Trends in Artificial Intelligence*, pp. 409-421, Springer International Publishing, 2014. As another example, a time-of-flight variation may be measured between a pulse emission of a pattern of radiation and the captured reflection of that pattern of radiation, or a time-of-flight variation may be measured by determining the phase shift between an emitted pattern of radiation modulated by a continuous wave and the captured reflection of that pattern of radiation. Time-of-flight variations such as these may be used to determine depth information of an object. An example of such a technique is provided in Zhu, Jiejie et al., "Fusion of time-of-flight depth and stereo for high accuracy depth maps." In Computer Vision and Pattern Recognition, 2008, CVPR 2008. IEEE Conference on, pp. 1-8, IEEE, 2008.

At 240, object characteristics of an object may be determined based upon a determined sequence of variations. An object characteristic may be a single aspect of a captured pattern of radiation or an object characteristic may be calculated from combinations of object characteristics. For example, variations in emitted and reflected radiation may be determined within certain elements of a grid of radiation. These certain elements may make up a pattern of grid elements. Object characteristics may be made up of a single captured pattern of grid elements, and further object characteristics such as dimensions of the object or positions of the object may be determined by calculating distances between selected grid elements of the pattern of grid elements. These dimensions or positions may be, for example, a height an object, a width of an object, or coordinates of an object. Object characteristics may be determined or measured in reference to a reference frame of the device, such as based upon a set of coordinates defined by the device's field of view, or an external reference frame, such as the room in which the device is located, global positioning system coordinates, or the like.

Other more complex object characteristic may be determined in a similar way. For example a 2D or 3D surface area of an object, a volume of an object, or a shape of an object may be determined based computations of distances amongst selected grid elements. A group of patterns of grid elements in a sequence of multiple patterns of grid elements may be analyzed to determine further object characteristics such as, for example, direction of travel, speed, or velocity of an object at the time of capture of a selected pattern of grid elements. Object characteristics may also include other physical attributes, such as a color of an object, a luminosity of an object, and the like.

Sequences of object characteristics may be stored in a room profile and associated with a user. For example, a sequence made up of multiple consecutive patterns of grid elements determined from radiation reflected from the user's legs when the user walks through the field of view may be captured and associated with the user as the user's gait. In a similar manner, a gesture of the user may be captured and associated with the user. Object characteristics stored in a room profile may serve as a basis for future comparison, such as, for example, determining an object is a user.

Object characteristics may also be determined by mapping techniques such as structured light mapping to determine object characteristics such as a two dimensional (2D) or three dimensional (3D) map of a room and/or the objects in a room, the square footage of the room, a volume of the room, or the like. An example of a suitable analysis technique is provided in Salvi, Joaquim, et al., "A state of the art in structured light patterns for surface profilometry." Pattern recognition 43, no. 8 (2010): 2666-2680. As another example, RGB-D mapping techniques may also be employed, such as described in Henry, Peter, et al., "RGB-D mapping: Using depth cameras for dense 3D modeling of indoor environments." in *In the* 12*th International Symposium on Experimental Robotics* (*ISER*. 2010).

Object characteristics of a room or other area of a premises may be combined with object characteristics of other rooms or areas in the premises to determine object characteristics of the premises as a whole. For example, maps of a given room may be combined with maps generated in other rooms of a premises in order to generate a 2D or 3D map of the premises. Similarly, object characteristics indicating the available volume in a given room may be combined with volume determinations in the other rooms of a premises in order to determine a total available volume for the premises. As another example, the movement of an object in one room may be combined with object characteristics of the same object, or an object that is identified as being potentially the same object, in another room, to determine a trajectory of the object as it moves from one room to another.

As disclosed herein, a sequence of object characteristics can include a single object characteristic or a group of object characteristics of an object at a single instant, or a set of such characteristics at a series of instants over time.

Method 200 may further include updating a room profile of the room at 250, to include the determined object characteristics. The room profile may include data about the room such as a continuously updated record of the objects in the room; historical sets of object characteristics in the room, such as 3D maps; or categorized sequences of object characteristics captured in the room, such as sequences of object characteristics associated with a user or event. For example, a room profile may contain a sequence of object characteristics determined from a sequence of multiple patterns of radiation captured by a device in the room when a user walks through a field of view of the device.

Figure 3A:
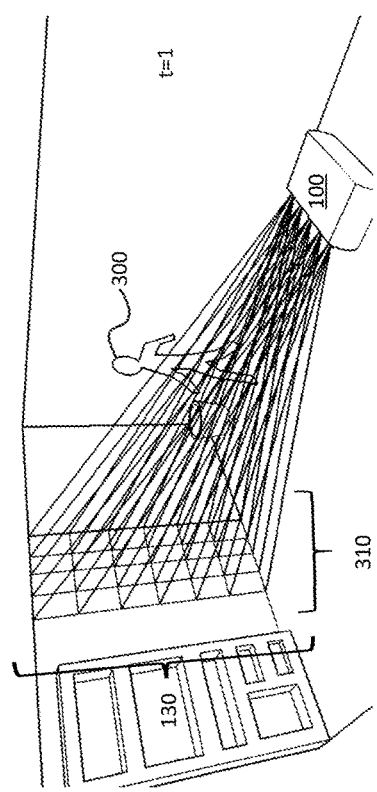
FIG. 3A shows a device in a room where a user is outside the field of view of the device according to an embodiment of the disclosed subject matter.
Figure 3B:
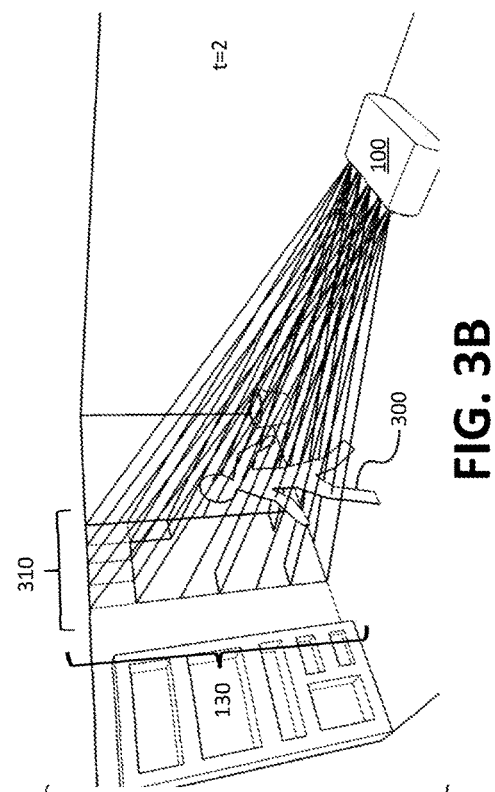
FIG. 3B shows a device in a room where a user is inside the field of view of the device according to an embodiment of the disclosed subject matter.
Figure 3C:
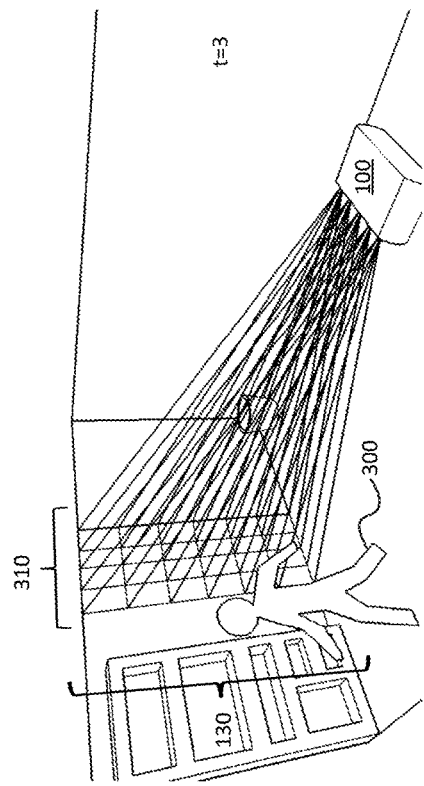
FIG. 3C shows a device in a room where the user is outside the field of view of the device according to an embodiment of the disclosed subject matter.

FIGS. 3A-3C shows, according to an embodiment of the disclosed subject matter, a device 110 in a room in which a user 300 travels through a field of view 310 of the device. In FIG. 3A the user is in the room at time t=1 but not yet within the field of view, and the emitted pattern of radiation 130 is undisturbed. In FIG. 3B the user is in the room at time t=2 and within the field of view. The emitted pattern of radiation is shown interrupted by the user's presence. As the user traverses the field of view, a range of variations in the pattern of radiation may be captured as well as the times that those variations occur. FIG. 3C depicts the user in the room at time t=3, and the emitted pattern of radiation is once again not disturbed. By determining variations in the pattern of radiation and correlations of those patterns over time, object characteristics can be determined. A user may be associated with those object characteristics and used to identify the user when the user is in the room. Additional embodiments for detecting a user are discussed in later portions of this specification.

Figure 4:
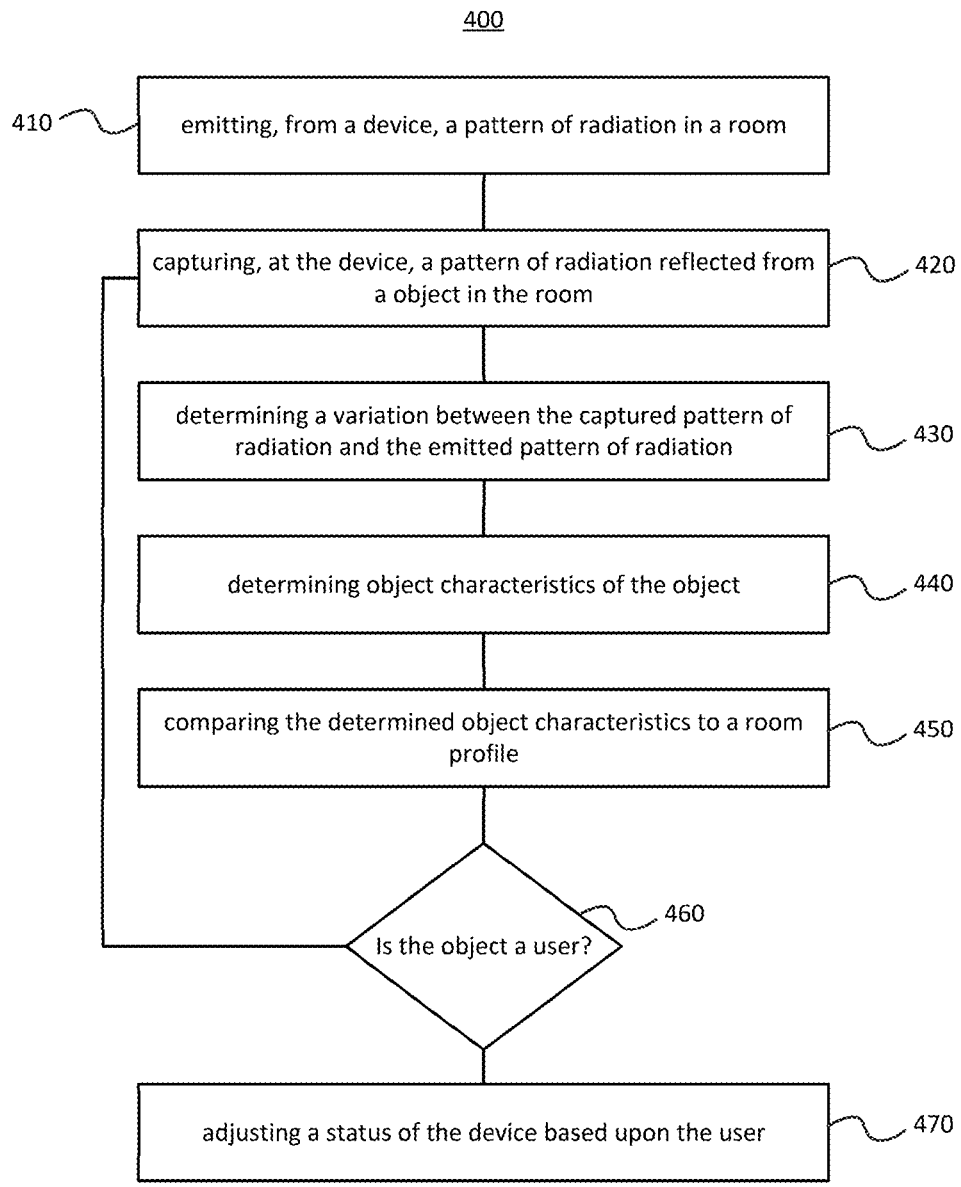
FIG. 4 shows a method for determining an object is a user and adjusting a status of a device according to an embodiment of the disclosed subject matter.

FIG. 4 shows a method 400 for adjusting a status of a device based upon a user according to an embodiment of the disclosed subject matter. The method 400 may include emitting, from a device, a pattern of radiation in a room at 410; capturing, at the device, a sequence of patterns of radiation reflected from an object in a room at 420; determining a sequence of variations between the captured sequence of patterns of radiation and an emitted sequence of patterns of radiation at 430; and determining object characteristics of an object based upon the sequence of variations at 440. The object characteristics may include, for example, a sequence of dimensions of the object and a sequence of locations of the object.

Method 400 may further include determining the object is a user based upon the determined object characteristics and a room profile. For example, the determined object characteristics may be compared to an existing room profile of the room at 450.

In a specific example of method 400 according to an embodiment of this disclosure, an emission component of the device may emit a pattern of infrared radiation throughout a field of view of the device. The pattern of radiation may be arranged as a grid. The grid may define a set of independently identifiable elements within the field of view. For example the device 100 of FIG. 3A emits a pattern of radiation 130 arranged as a grid. The lines of radiation define squares, which may be the elements of the grid. An object may move through the field of view and reflect emitted radiation as the object passes into a first element. A capture component of the device may capture the radiation reflected by the object as it travels into the first element and detect the object based on a variation between the emitted pattern of radiation and captured pattern of radiation. For example, in the absence of reflection from an object, a line of radiation of the emitted pattern of radiation may be anticipated to be in one location; however when the line reflects from an object in its path, the location may vary from this anticipated location. Based on this variation, the presence of the object may be detected.

When moving into the first element, the depth of the object may be determined based on another variation between the emitted pattern of radiation and captured pattern of radiation. For example, a depth of the object may be determined through time of flight techniques based on a variation in phase between the emitted pattern of radiation and captured pattern of radiation. In this way the depth within the grid may be determined and a 3D location of the object may be determined.

The object may continue to move through the field of view and reflect emitted radiation as the object passes out of the first element and into a second element, and then a third element, and so forth, until the object has completely passed through the field of view. The capture component may capture the reflected radiation as the object passes into and out of elements of the grid. The object may inhabit multiple elements of the grid at a given time, and thus reflected radiation from multiple elements may be captured at a given time. At a first time the elements inhabited by the object may make up a first pattern of grid elements and this pattern may be captured. At a second time, the elements inhabited by the object may make up a second pattern of grid elements and this pattern may be captured. At a third time, the elements inhabited by the object may make up a third pattern of grid elements, and so forth. The first pattern, second pattern, third pattern, and so forth may make up a sequence of patterns of grid elements.

When determining the object is a user, the captured sequence of patterns of grid elements may be analyzed, such as, for example, in the manner discussed above, to determine further object characteristics of the object. The device may have previously captured a sequence of patterns of grid elements associated with the user and stored that sequence in a room profile as object characteristics associated with the user. This sequence of object characteristics may have been intentionally captured by the user, such as, for example, where the user of the device walks through the field of view while the device is set to capture a sequence of object characteristics to be associated with the user. In another example, the device may have previously captured a sequence of patterns of grid elements and automatically learned to associate that sequence of grid elements as object characteristics associated with the user. For example the detection of a particular sequence of object characteristics may occur temporally proximate to receiving user data that identifies the user as being located in the room, such as, for example, a GPS location data from a mobile device associated with the user. The particular sequence of object characteristics may then be associated with the user associated with the mobile device such that detection of the particular sequence of object characteristics may determine the object is the user.

Continuing the example of method 400, the determined object characteristics may be compared to the object characteristics associated with the user stored in the room profile. If the captured object characteristics match object characteristics stored in the room profile associated the user, then the captured sequence of patterns of grid elements may be determined to be the user. For example, the captured sequence of patterns of grid elements may determine a width and a height of the object that match a width and height associated with the user stored in the room profile. This match may be a match within a margin of error, such as a threshold value of 10%. For example the width of the captured pattern of radiation may be 15 inches and height of the captured pattern of radiation may be 72 inches. The room profile may contain object characteristics associated with the user of a width of 16 inches and a height of 70 inches. Therefore the margin of error of the width would be $\frac{1}{16}$~6.25% and for the margin of error for the height would be $\frac{2}{70}$~2.86%. Each of these determinations would be within the 10% threshold value, and therefore the object may be determined to be the user.

If it is determined that the object is a user at 460, then the status of the device may be adjusted based upon the user at 470. Adjusting a status of the device may include adjusting the status of an apparatus in which the device is incorporated, adjusting a status of a system of which a device is a part, such as where the device is coupled to a network in communication with other devices of the system, or adjusting the status of the device itself. Adjusting the status of the device may include a range of status adjustments, including: activating a light, sound, or tactile indicator; enabling access to a user interface; activating a user interface; restricting access to a device; changing a temperature setting; changing a lighting setting; changing a security setting; increasing a device timer; and disabling an alarm. Further, adjusting the status of the device may include activating a setting in a premises management system that is personalized for a user. For example, determining an object is associated with a user who is vision impaired may cause an adjustment of a lighting system that increases the lighting level. Similarly, determining an object is associated with a user who is sensitive to humidity may cause an adjustment to a temperature control system that lowers the temperature. Embodiments disclosed herein may use object characteristics, and the match of an observed object to known characteristics, to authenticate a user in order to grant access to a device or system. A positive comparison of the determined object characteristics to a room profile of the room may be a credential sufficient to authenticate a user or it may be one of several credentials used in combination to authenticate a user.

In an example of method 400, a device may be coupled to a network in communication with a temperature control system such as a smart thermostat. The system may be in a home where occupants of the home include a user and the user's seven year old child. A status of the home thermostat may be set to "locked" unless the thermostat recognizes an authorized user. Recognition of an authorized user may be linked to object characteristics stored in a room profile of the device. For example, the object characteristics could be based upon a pattern of radiation that would be reflected by an average adult man above five feet tall within the field of view of the device. Therefore, when the child attempts to access the device, it would remain locked because when the child traverses the field of view, no pattern of radiation would be reflected above five feet within the field of view. However, when the adult walked within the field of view, the status of the device would recognize the variation in the pattern above five feet and adjust the status of the device to "unlocked."

In a related example, a thermostat may be in a default "unlocked" status. However, object characteristics based on a pattern of radiation consistent with a reaching arm of a small child may be captured. In this circumstance, the status may be adjusted to "locked" in order to prevent the child from accessing the thermostat.

In another example, determining the object is a user may also be based on received user data. For instance, in the above example, alternatively or in addition to the captured object characteristics, cellular signal data associated with the user may be used to determine that the detected object is a user. For example, data that indicates the user's cellular device is within 300 yards of the room, and a weekly travel pattern of the user that indicates the user typically arrives home at a time within an hour of the current time may indicate that the object is a user. Various other additional user data may be received and used alone or in combination to determine an object is a user, such as: a geofence boundary indicator data, a global positioning system location data, a Bluetooth low energy (BLE) signal data, a near field communication (NFC) signal data, a cellular signal data, an online status data, a profile status data, a schedule data, a calendar data, a health monitoring data, a biometric voice recognition pattern data, and an audible user password data.

In another example, determining the object is a user may be based on premises data from other sensors in a premises, such as those that may be included in a smart home environment as described in later portions of this disclosure. For example, premises data such as data from an open/close door sensor may indicate the front door has been opened. In addition, a locked/unlocked indicator may indicate the front door has been unlocked. The open/close sensor and the locked/unlocked sensor may each be coupled to a network in communication with a system embodying aspects of the subject matter of this disclosure. The premises data may be received and cause a device of the system to attempt to emit radiation and capture object characteristics associated with the user. If the device detects an object not associated with an authorized user within a period of time, then a status may be adjusted to cause an alarm to activate because data indicated the front door had been opened and an object had been detected that was not an authorized user.

In some embodiments, determining an object is a user may be based on a combination of one or more of object characteristics, a room profile, user data, and/or premises data. For example, premises data may be received at a device over a home network from an open/closed sensor located at a front door of a premises. The premises data may indicate the front door is open. User data may be received over the home network from a mobile handset associated with a user, indicating that the mobile handset has logged onto the home network. The device may be located down a hallway leading from the front door as determined, for example, by a wireless network receiver or other sensor in the premises. A room profile may contain object characteristics based on a sequence of patterns of radiation that have been reflected and captured when the user walks past the field of view of a capture component of the device. The capture component of the device may determine object characteristics of an object based on a determined sequence of variations in patterns of radiation reflected from the object. The device may compare the determined object characteristics to object characteristics associated with the user contained in the room profile. If the comparison is within a threshold difference, then the object may be determined to be the user and a status of the device may be adjusted. For example a security system may be disarmed.

The order and timing of events may be incorporated into determinations that an object is a user. Continuing with the preceding example, receiving the user data, receiving the premises data, and comparing the determined object characteristics to the object characteristics associated with the user may be specified as an ordered set for comparison purposes. For example, in such an embodiment, if comparing the determined object characteristics to the object characteristics associated with the user is completed first and then at a later time the user data is received and the premises data is received indicating the door is opened, the order would be violated and a status of the device may be adjusted in a different way. For example the security system may send a notice to the user that the door is open. Similarly, if the premises data indicating the door is open is received, but user data is not received for 45 minutes, detection of the sequence may be terminated, and the status of the device may not be adjusted.

In another example, a premises management system such as a security system may be located in a room such that the device is not readily apparent to an occupant. For example, a premises management system may be integrated into the materials of an architectural feature of the room such as a wall or into an object in the room such as a cabinet or furniture. The premises management system may be in communication with an embodiment of a device in accordance with the subject matter of this disclosure. The device may have one or more emission components and capture components to detect a user of the security system and determine that that captured object characteristics indicate the user is on a trajectory leading to the system. This determination may cause the device to adjust the status of the security system, which causes the system to activate a user interface, such as by illuminating a display or emitting an audible alert. If the user was detected but it was determined the user was not on a trajectory leading to the security system, then the device may not activate a user interface in order to maintain the unobtrusive appearance of the security system.

Figure 5:
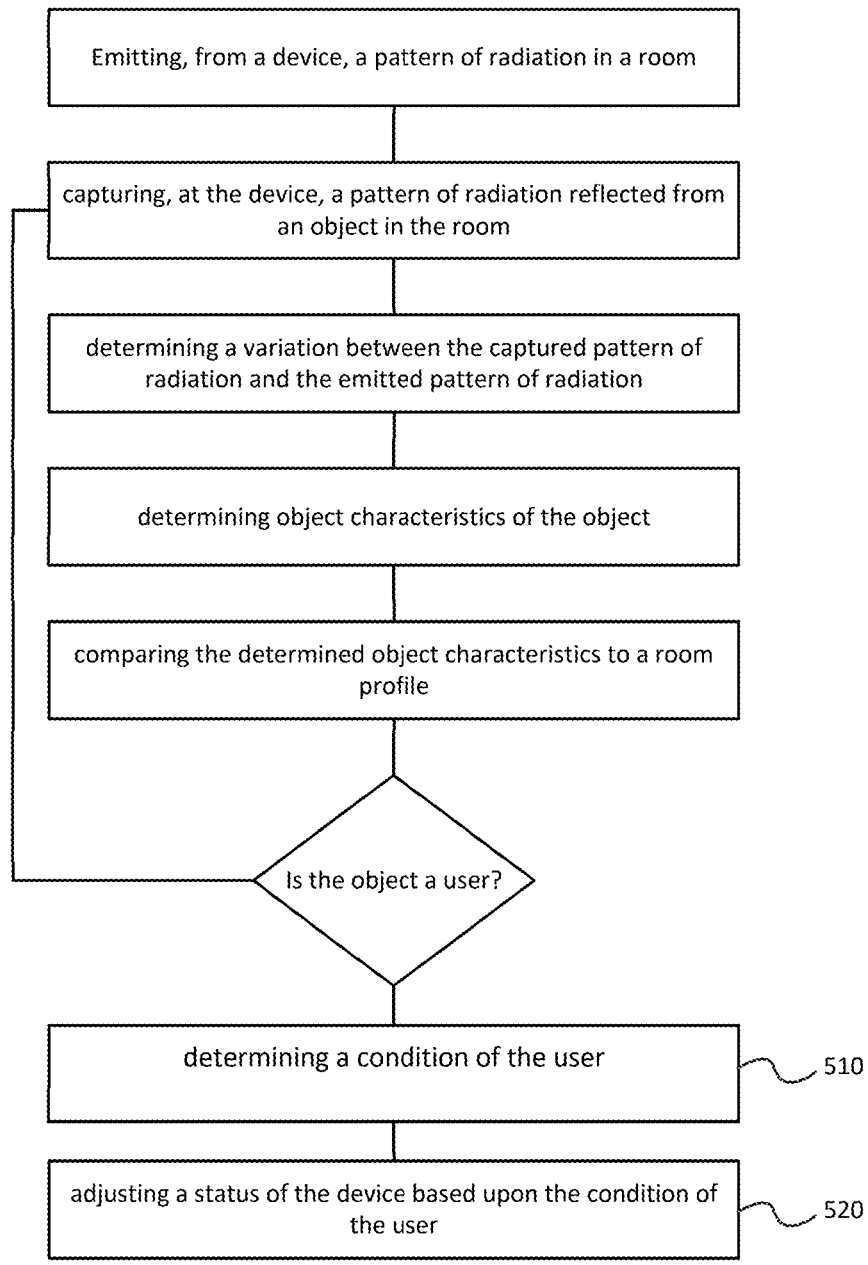
FIG. 5 shows a method for determining a condition of a user and adjusting a status of a device according to an embodiment of the disclosed subject matter.

In some embodiments a condition of a user also may be determined, and the status of one or more devices adjusted based upon the user's status. A condition of a user may be a characteristic detected about the user that is based at least in part on data or patterns of radiation received in addition to the patterns of radiation or data used to determine the object is the user. FIG. 5 shows an example method 500 for adjusting a status of a device based upon a condition of a user according to an embodiment. In addition to the steps shown earlier, method 500 may include, determining a condition of a user at 510, and adjusting a status of the device based on the condition of the user at 520. In an example, a device may be in communication with a security system. A user could be detected because user data had been received indicating the presence of the user in the room. For example, a geofence boundary indicator associated with the user could be triggered. However, when the user enters the field of view of the device, object characteristics may be reflected that indicate a much wider lateral dimension for the user than object characteristics associated with the user. The wider object characteristic may be associated with a condition that the user is carrying baggage. Therefore the method may determine the condition that the user is carrying baggage. The security system may have a timer that activates an alarm after 30 seconds if any unconditioned person enters the premises and fails to enter a pass code. When the method determines the user is carrying baggage, it may adjust a status of the device that extends the alarm timer for an additional period of time. This would give the user additional time to put down the baggage and enter his pass code.

Additional conditions of the user could also be determined. For example, conditions may include: the user is limping, the user is carrying an object with two hands, the user is traveling more slowly than normal; the user is using crutches; the user is in a wheel chair, the user has collapsed, and the user is asleep. Additional user data or premises data may serve as an additional bases upon which the method determines conditions of the user. For example, a user's health monitoring data could indicate a slow pulse rate, blood pressure, and breathing patterns. This data could be combined with object characteristics derived from a static captured radiation pattern to determine the user is sleeping. The object characteristics, user data, and/or, premises data associated with a condition may be part of a room profile.

Figure 6:
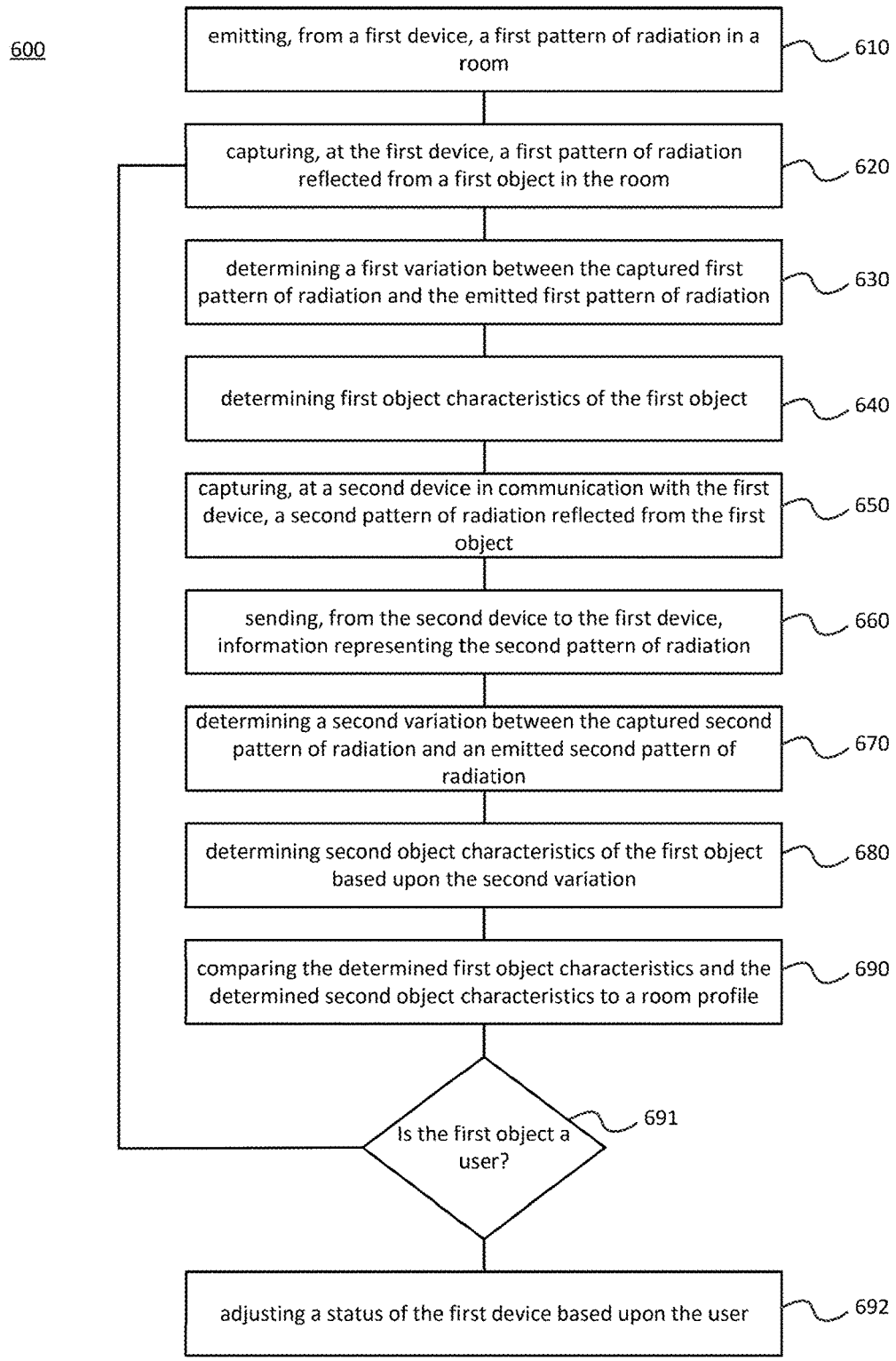
FIG. 6 shows a method employing multiple devices for determining an object is a user and adjusting a status of a device according to an embodiment of the disclosed subject matter.

Multiple devices may be operatively connected to perform various techniques disclosed herein. FIG. 6 shows an example method 600 employing multiple devices for adjusting a status of a device based upon a user according to an embodiment. A first device may emit a first pattern of radiation at 610, capture a first pattern of radiation reflected from a first object at 620, determine a first variation between the captured first pattern of radiation and the emitted first pattern of radiation at 630, and determine first object characteristics of the first object at 640. A second device may be in communication with the first device and capture a second pattern of radiation reflected from the first object at 650. This second pattern may be initially emitted by the first device but reflect from the first object in a different direction and thus be captured by the second device. The second device may then send to the first device, information representing the second pattern of radiation at 660. Method 600 may then determine a second variation between the captured second pattern of radiation and an emitted second pattern of radiation at 670 and determine second object characteristics of the first object based upon the second variation 680. The determination that the first object is a user at 691 may be based upon both the first object characteristics and the second object characteristics, a room profile, a user data, and/or a premises data. For example, the method may compare the determined first object characteristics and the determined second object characteristics to a room profile at 690. The result of the comparison may be quantified to be within a threshold value, and thereby the first object may be determined to be a user. As a result of this determination, a status of the device may be adjusted at 692.

Certain features, such as object curvature, may be more easily detected in the field of view of the second device than the field of view of the first device and thus a more robust set of object characteristics may be determined by combining devices. Also, the second device may not contain emission components and thus provide the benefit of additional data collection without the power and processing resources demanded by a emitting a second emission pattern.

Two devices may also be employed in embodiments where a single beam of radiation may be emitted from a first device and captured at a second device. If an object traverses the beam, the capturing device can detect a failure to capture the radiation as a variation, and a status can be adjusted based on the detection of this variation. Where suitable for the purposes of this disclosure, any combination of two or more devices of the same or varying functionality may be combined.

Other combinations of devices are also contemplated by this disclosure, such as where a first device emits a pattern of radiation and detects a first object, and a second device, in communication with the first devices, emits its own pattern of radiation and detects the first object. In this example the frame rate of the first device may be offset from the second device, such as by one half cycle. This combination has the advantage of increasing temporal resolution without increasing the frame rate of either device and thus not requiring overall increased processing power.

Figure 7A:
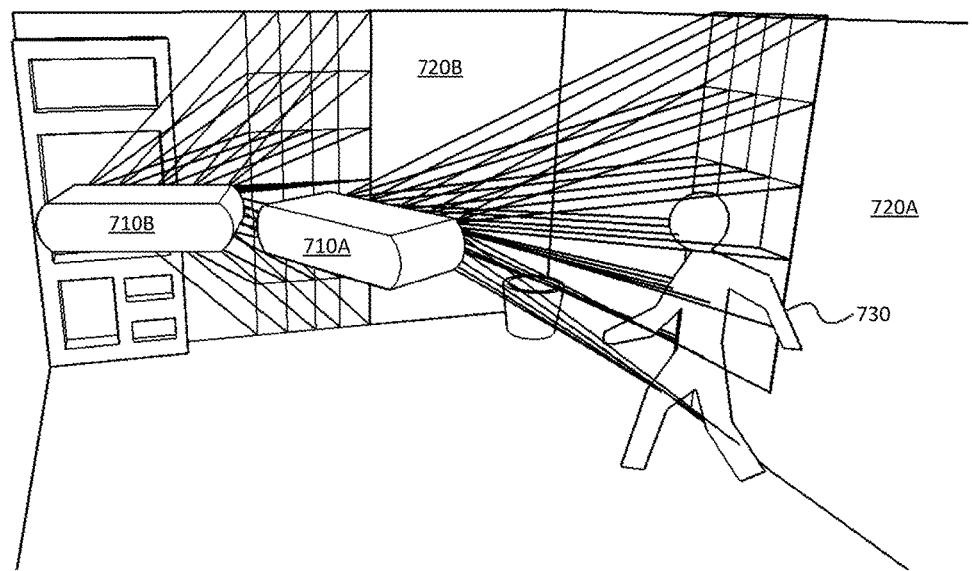
FIG. 7A shows a first view of multiple devices in a room according to an embodiment of the disclosed subject matter.
Figure 7B:
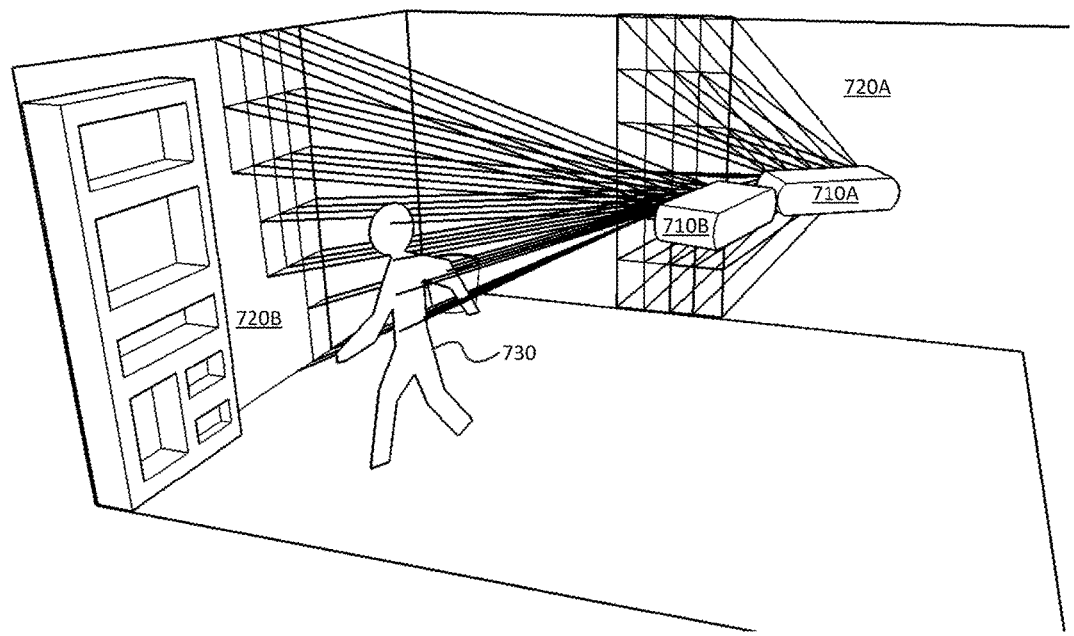
FIG. 7B shows a second view of multiple devices in a room according to an embodiment of the disclosed subject matter.

Multiple devices may each emit and capture patterns of radiation reflected from different objects, such as where the devices have different fields of view in the same room and thus may map different static features of the room, such as pieces of furniture. In such an example, the object characteristics captured by these devices may be combined into a single room profile. For example, according to an embodiment of the disclosed subject matter, in FIGS. 7A-7B the second device 710B may capture object characteristics reflected by the static features of the wall 720B, and the first device 710A may capture object characteristics reflected by the static features of the wall 720A. The object characteristics captured by both devices may be combined and included in a single room profile accessible by each device. As a specific example, a user 730 may routinely traverse the room within the field of view of both devices such that a sequence of patterns of reflected radiation may be captured by each device as the user traverses the room. A sequence of object characteristics of the user may be determined from each of these sequences, which may also be included in the room profile.

Figure 8:
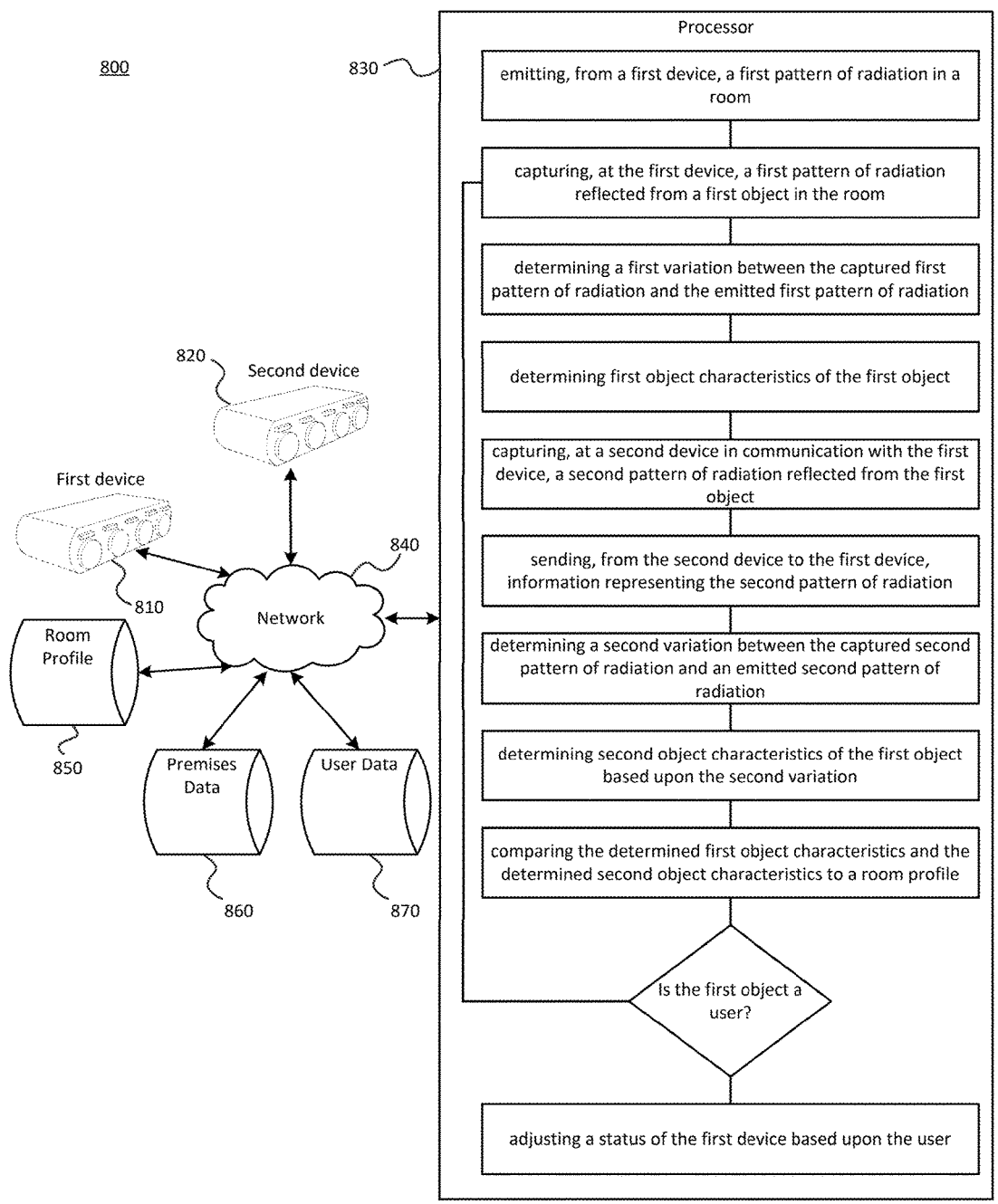
FIG. 8 shows a system for determining an object is a user and adjusting a status of a device according to an embodiment of the disclosed subject matter.

FIG. 8 shows a system 800 for adjusting a status of a device based upon a user according to an embodiment of this disclosure. The system may include one or more devices 810, 820 having one or more image capture components, a processor 830 in communication with the one or more devices, such as by a network 840, and one or more databases in communication with the processor for storing a room profile 850, premises data 860, and a user data 870. The processor may be configured to execute instructions for determining a first object is a user. In embodiments of this disclosure, the processor may be a component incorporated into and in communication with one or more devices disclosed herein or remote from and in communication with one or more devices disclosed herein. In some cases, the processor and various other resources may be provided by a cloud-based or other remote system. Similarly, a room profile, premises data, and user data may be stored locally and in communication with one or more devices disclosed herein or stored remotely and in communication with one or more devices disclosed herein, such as a cloud-based system.

Figure 9:
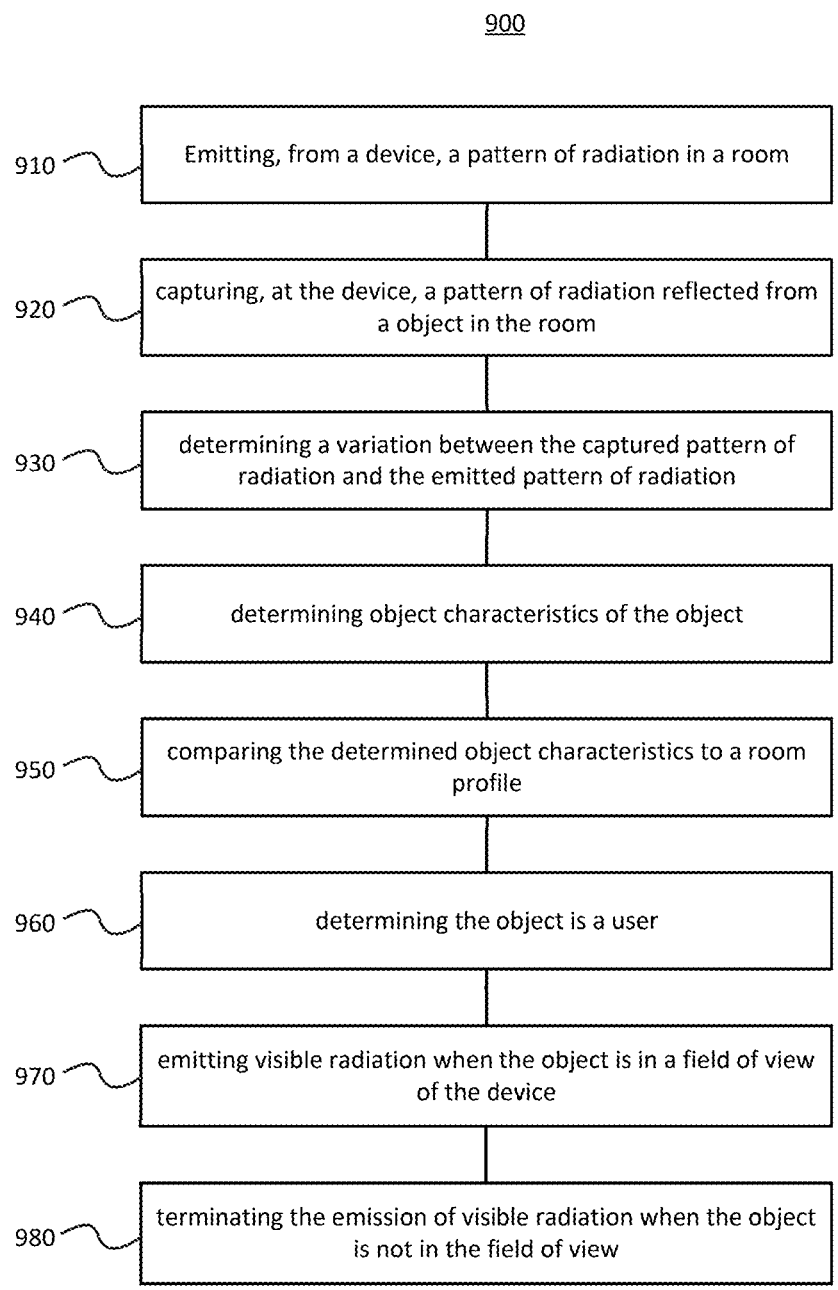
FIG. 9 shows a method for calibrating a device according to an embodiment of the disclosed subject matter.

The methods and systems set forth in this disclosure may automate and streamline user interaction with home systems. As an example, FIG. 9 shows a method 900 for calibrating a device according to an embodiment of the disclosed subject matter. Method 900 may also be implemented in a suitable system, such as that shown in FIG. 8. Method 900 may allow a user to determine the bounds of a field of view of a device by traveling through the field of view of the device and observing when the device starts or stops emitting visible radiation. In this way the user may easily calibrate the scope of coverage of the device.

Method 900 may be a mode of a device described as "test mode." It may include emitting, from a device having a field of view, a sequence of patterns of infrared radiation at 910; capturing, at the device, a sequence of patterns of infrared radiation reflected from an object in a room at 920; determining a sequence of variations between the captured sequence of patterns of infrared radiation and the emitted sequence of patterns of infrared radiation at 930; and detecting the object based upon the determined sequence of variations. Continuing the example, detecting the object may include determining object characteristics of the object at 940, comparing the determined object characteristics to a room profile at 950, determining the object is a user at 960, emitting visible radiation from radiation emission components disposed within the device when the object is in a field of view of the device at 970, and terminating the emission of visible radiation from one or more radiation emission components when the object is not in the field of view at 980. By determining the object is a user, calibration of the device can take place more accurately because the device may be more likely to be detecting the intended user rather than an undesirable object. However, in some embodiments, merely determining an object is in the field of view may be sufficient, and a determination that the object is a user may not be required.

The field of view of the device of method 900 may be segmented into two or more subfields. The radiation emission components of the device may each have a position on the device corresponding to a position of a least one subfield. For example, each of the radiation emission components 110 located horizontally along device 100 of FIG. 1A may correspond to one or more proximate subfields of one or more of the capture components 120. When the processor detects the object in a subfield, it may cause the emission of visible radiation from the radiation emission component that has a position corresponding to a position of the subfield. Similarly, when an object is not in a subfield, the corresponding emission component may cease emitting. In this way a user may track where in the scope of the field of view she is located by watching which radiation emission component is emitting. For example, if the user traversed the emitting face of device 100, emission components 110 may each emit and then cease to emit in the same direction and sequence as the user's direction of travel.

The methods, systems, and devices set forth in the subject matter of this disclosure may be in communication with other methods, systems, and devices throughout a premises. Combined these systems, methods, and devices may make up the greater smart home environment for the premises. Additional aspects of the smart home environment and related components are discussed in the following portions of this disclosure.

In general, a "sensor" as disclosed herein may include multiple sensors or sub-sensors, such as a position sensor that includes both a global positioning sensor (GPS) as well as a wireless network sensor. This combination may provide data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 10A:
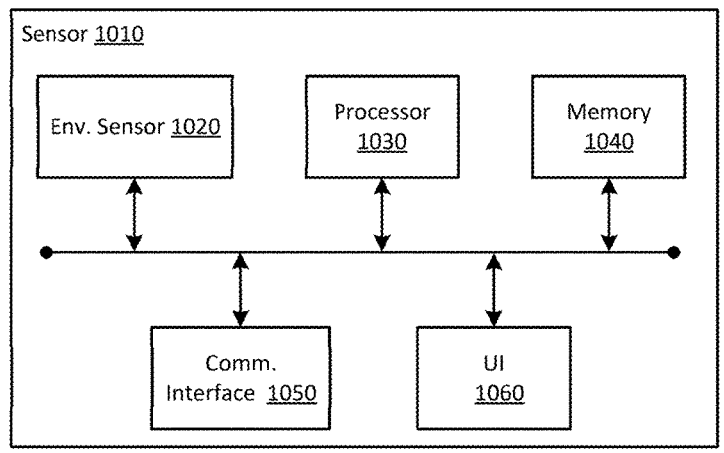
FIG. 10A shows a sensor according to an embodiment of the disclosed subject matter.

A sensor may include hardware in addition to the specific physical sensor that obtains information about the environment. FIG. 10A shows an example sensor as disclosed herein. The sensor 1010 may include an environmental sensor 1020, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 1010 is located. A processor 1030 may receive and analyze data obtained by the sensor 1010, control operation of other components of the sensor 1010, and process communication between the sensor and other devices. The processor 1030 may execute instructions stored on a computer-readable memory 1040. The memory 1040 or another memory in the sensor 1010 may also store environmental data obtained by the sensor 1010. A communication interface 1050, such as a Wi-Fi or other wireless interface, Ethernet or other local network interface, or the like may allow for communication by the sensor 1010 with other devices. A user interface (UI) 1060 may provide information and/or receive input from a user of the sensor. The UI 1060 may include, for example, a speaker to output an audible alarm when an event is detected by the sensor 1060. Alternatively, or in addition, the UI 1060 may include a light to be activated when an event is detected by the sensor 1010. The user interface may be relatively minimal, such as a liquid crystal display (LCD), LED display, or limited-output display, or it may be a full-featured interface such as a touchscreen. Components within the sensor 1010 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Figure 10B:
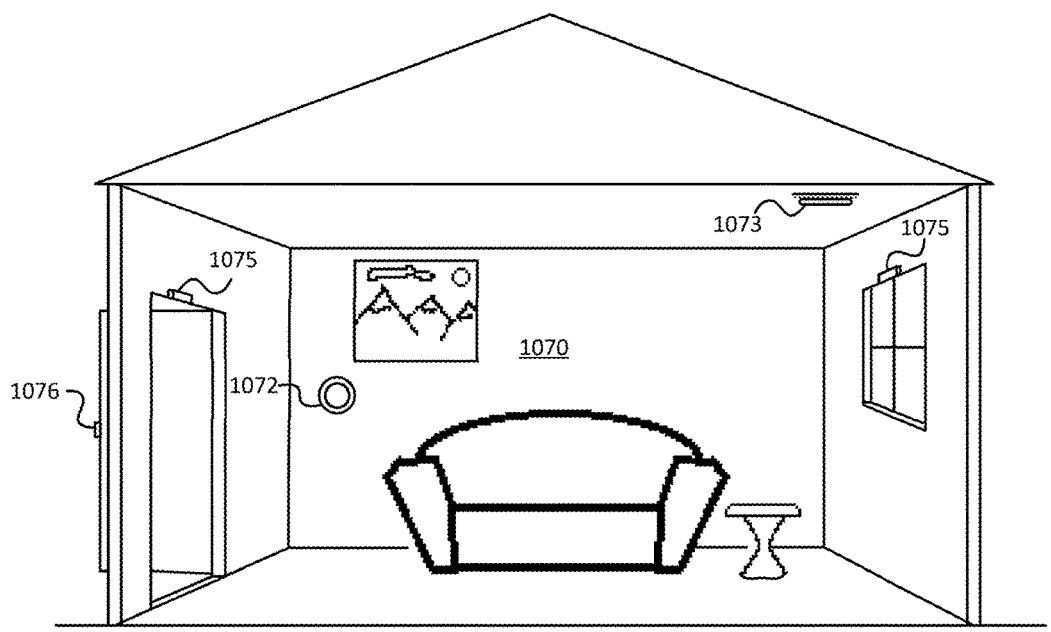
FIG. 10B shows a premises according to an embodiment of the disclosed subject matter.

As an example of the implementation of sensors within a premises FIG. 10B depicts, one or more sensors implemented in a home premises 1070 as part of a smart home environment. The smart home environment may include multiple types of premises management devices, such as one or more intelligent, multi-sensing, network-connected thermostats 1072, one or more intelligent, multi-sensing, network-connected poisonous gas detection units 1073, one or more intelligent, multi-sensing, network-connected entry detection units 1075, and one or more network-connected door handles 1076.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors, that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

As another example, a system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the system is activated, it may interpret such non-detection as the door being ajar or open. In some configurations, a separate sensor or a sensor integrated into one or more of the magnetometer and/or magnet may be incorporated to provide data regarding the status of the door. (A status of a door, physical status, occupancy status, or status of a premises are distinct from a status of a device as described above) For example, an accelerometer and/or a compass may be affixed to the door and indicate the status of the door and/or augment the data provided by the magnetometer. FIG. 11A shows a schematic representation of an example of a door that opens by a hinge mechanism 1110. In the first position 1120, the door is closed and the compass 1180 may indicate a first direction. The door may be opened at a variety of positions as shown 1130, 1140, and 1150. The fourth position 1150 may represent the maximum amount the door can be opened. Based on the compass 1180 readings, the position of the door may be determined and/or distinguished more specifically than merely open or closed. In the second position 1130, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

FIG. 11B shows a compass 1180 in two different positions, 1120 and 1140, from FIG. 11A. In the first position 1120, the compass detects a first direction 1160. The compass's direction is indicated as 1170 and it may be a known distance from a particular location. For example, when affixed to a door, the compass may automatically determine the distance from the door jamb or a user may input a distance from the door jamb. The distance representing how far away from the door jamb the door is 1160 may be computed by a variety of trigonometric formulas. In the first position 1120, the door is indicated as not being separate from the door jamb (i.e., closed). Although features 1160 and 1170 are shown as distinct in FIG. 11B, they may overlap entirely. In the second position 1140, the distance between the door jamb and the door 1190 may indicate that the door has been opened wide enough that a person may enter. Thus, the sensors may be integrated into a home system, mesh network, or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 1230 and/or remote system 1240 depicted in FIG. 12A. The data may be analyzed to learn a user behavior, an environment state, and/or as a component of a smart home system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, other openings, etc.

The data collected from one or more sensors may be used to determine the physical status and/or occupancy status of a premises. For example, open/close sensors such as door sensors as described with respect to FIGS. 11A and 11B may be used to determine that an unknown person has entered the premises. The system may first determine that a person has entered the premises due to sensors detecting a door opening and closing in a time span previously determined to be consistent with a person entering or leaving the premises. The system next may identify the person as "unknown" due to the absence of a smartphone, key fob, wearable device, or other device typically used to identify occupants of the premises. Continuing the example, sensor data may be received indicating that a valuable item within the premises has been moved, or that a component of the smart home environment associated with security functions such as a controller disclosed herein, has been moved or damaged. Such sensor data may be received, for example, from a sensor attached to or otherwise associated with the valuable item, from the smart home component itself, or from one or more other sensors within the smart home environment. In response, the system may generate an alert indicating that an unknown person has entered the premises and/or that the item or component has been moved or damaged. The system may further determine that an occupant of the home is close by but not present in the premises, for example based upon a Wi-Fi signal received from the occupant's smartphone, but an absence of near-field or other short-range communication from the same smartphone. In this case, the system may be configured to send the alert to the occupant's smartphone, such as via SMS, email, or other communication. As another example, the system may determine that the premises is already in an "away" state and that no occupants are nearby or expected to return in the near future. In this case, the system may be configured to send the alert to a local law enforcement agency, such as via email, SMS, recorded phone call, or the like.

Data generated by one or more sensors may indicate patterns in the behavior of one or more users and/or an environment state over time, and thus may be used to "learn" such characteristics. For example, sequences of patterns of radiation may be collected by a capture component of a device in a room of a premises and used as a basis to learn object characteristics of a user, pets, furniture, plants, and other objects in the room. These object characteristics may make up a room profile of the room and may be used to make determinations about objects detected in the room.

In another example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 pm, and then declines until another approximate time or time period, such as 5:30 pm, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 pm, an occupant is turning on/off a light as the occupant of the room in which the sensor is located enters/leaves the room. At other times, the light sensor data may indicate that no lights are turned on/off in the room. The system, therefore, may learn occupants' patterns of turning on and off lights, and may generate a response to the learned behavior. For example, at 5:30 pm, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Such learning behavior may be implemented in accordance with the techniques disclosed herein. For example, a smart home environment as disclosed herein may be configured to learn appropriate notices to generate or other actions to take in response to a determination that a notice should be generated, and/or appropriate recipients of a particular notice or type of notice. As a specific example, a smart home environment may determine that after a notice has been sent to a first occupant of the smart home premises indicating that a window in a room has been left open, a second occupant is always detected in the room within a threshold time period, and the window is closed shortly thereafter. After making such a determination, in future occurrences the notice may be sent to the second occupant or to both occupants for the purposes of improving the efficacy of the notice. In an embodiment, such "learned" behaviors may be reviewed, overridden, modified, or the like by a user of the system, such as via a computer-provided interface to a smart home environment as disclosed herein.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 12A:
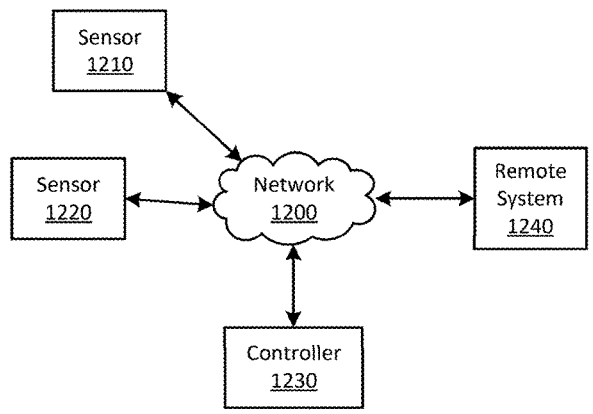
FIG. 12A shows networked sensors according to an embodiment of the disclosed subject matter.

FIG. 12A shows an example of a sensor network as disclosed herein, which may be implemented over any suitable wired and/or wireless communication networks. One or more sensors 1210 and 1220 may communicate via a local network 1200, such as a Wi-Fi or other suitable network, with each other and/or with a controller 1230. The controller may be a general- or special-purpose computer. The controller may, for example, receive, aggregate, and/or analyze environmental information received from the sensors 1210 and 1220. The sensors 1210 and 1220 and the controller 1230 may be located locally to one another, such as within a single dwelling, office space, building, room, or the like, or they may be remote from each other, such as where the controller 1230 is implemented in a remote system 1240 such as a cloud-based reporting and/or analysis system. Alternatively or in addition, sensors may communicate directly with a remote system 1240. The remote system 1240 may, for example, aggregate data from multiple locations, provide instruction, software updates, and/or aggregated data to a controller 1230 and/or sensors 1210, 1220.

The devices of the disclosed subject matter may be communicatively connected via the network 1200, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in methods and systems of the disclosed subject matter may avoid communication using a single device. That is, in the mesh-type network, such as network 1200, there is no single point of communication that may fail so as to prohibit devices coupled to the network from communicating with one another.

The communication and network protocols used by the devices communicatively coupled to the network 1200 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 1200, may be easy to set up and secure to use. The network 1200 may use an authentication scheme, such as AES (Advanced Encryption Standard) encryption or the like, to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 1200, which may be a Thread network, may provide security at the network and application layers. One or more devices communicatively coupled to the network 1200 (e.g., controller 1230, remote system 1240, and the like) may store product install codes to ensure only authorized devices can join the network 1200. One or more operations and communications of network 1200 may use cryptography, such as public-key cryptography.

The devices communicatively coupled to the network 1200 of the smart home environment disclosed herein may have low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 1200 may use the power-efficient IEEE 802.15.4 MAC/PHY protocol. In embodiments of the disclosed subject matter, short messaging between devices on the network 1200 may conserve bandwidth and power. The routing protocol of the network 1200 may reduce network overhead and latency. The communication interfaces of the devices coupled to the smart home environment may include wireless system-on-chips to support the low-power, secure, stable, and/or scalable communications network 1200.

The sensor network shown in FIG. 12A may be an example of a smart home environment. The depicted smart home environment may include a structure, a house, office building, garage, mobile home, or the like. The devices of the smart home environment, such as the sensors 1210 and 1220 the controller 1230, and the network 1200 may be integrated into a smart home environment that does not include an entire structure, such as an apartment, condominium, or office space.

The smart home environment can control and/or be coupled to devices outside of the structure. For example, one or more of the sensors 1210 and 1220 may be located outside the structure, for example, at one or more distances from the structure (e.g., sensors 1210 and 1220 may be disposed outside the structure, at points along a land perimeter on which the structure is located, and the like). One or more of the devices in the smart home environment need not physically be within the structure. For example, the controller 1230 which may receive input from the sensors 1210 and 1220 may be located outside of the structure.

The structure of the smart home environment may include a plurality of rooms, separated at least partly from each other via walls. The walls can include interior walls or exterior walls. Each room can further include a floor and a ceiling. Devices of the smart home environment, such as the sensors 1210 and 1220, may be mounted on, integrated with and/or supported by a wall, floor, or ceiling of the structure.

The smart home environment including the sensor network shown in FIG. 12A may include a plurality of devices, including intelligent, multi-sensing, network-connected devices, that can integrate seamlessly with each other and/or with a central server or a cloud-computing system (e.g., controller 1230 and/or remote system 1240) to provide home-security and smart home features. The smart home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 1210 and 1220 shown in FIG. 12A.

For example, a smart thermostat may detect ambient climate characteristics (e.g., temperature and/or humidity) and may accordingly control an HVAC (heating, ventilating, and air conditioning) system of the structure. For example, the ambient climate characteristics may be detected by sensors 1210 and 1220 shown in FIG. 12A, and the controller 1230 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 1210 and 1220 shown in FIG. 12A, and the controller 1230 may control an alarm system to provide a visual and/or audible alarm to the user of the smart home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 1230.

In some embodiments, the smart home environment of the sensor network shown in FIG. 12A may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 1210 and 1220 shown in FIG. 12A. A smart wall switch may detect ambient lighting conditions, and control a power and/or dim state of one or more lights. For example, a sensor such as sensors 1210 and 1220, may detect ambient lighting conditions, and a device such as the controller 1230 may control the power to one or more lights (not shown) in the smart home environment. Smart wall switches may also control a power state or speed of a fan, such as a ceiling fan. For example, sensors 1210 and 1220 may detect the power and/or speed of a fan, and the controller 1230 may adjust the power and/or speed of the fan, accordingly. Smart wall plugs may control supply of power to one or more wall plugs (e.g., such that power is not supplied to the plug if nobody is detected to be within the smart home environment). For example, one of the smart wall plugs may control supply of power to a lamp (not shown).

In embodiments of the disclosed subject matter, a smart home environment may include one or more intelligent, multi-sensing, network-connected entry detectors (e.g., "smart entry detectors"). Such detectors may be or include one or more of the sensors 1210 and 1220 shown in FIG. 12A. The illustrated smart entry detectors (e.g., sensors 1210 and 1220) may be disposed at one or more windows, doors, and other entry points of the smart home environment for detecting when a window, door, or other entry point is opened, broken, breached, and/or compromised. The smart entry detectors may generate a corresponding signal to be provided to the controller 1230 and/or the remote system 1240 when a window or door is opened, closed, breached, and/or compromised. In some embodiments of the disclosed subject matter, the alarm system, which may be included with controller 1230 and/or coupled to the network 1200 may not arm unless all smart entry detectors (e.g., sensors 1210 and 1220) indicate that all doors, windows, entryways, and the like are closed and/or that all smart entry detectors are armed.

The smart home environment of the sensor network shown in FIG. 12A can include one or more intelligent, multi-sensing, network-connected doorknobs (e.g., "smart doorknob"). For example, the sensors 1210 and 1220 may be coupled to a doorknob of a door (e.g., doorknobs located on external doors of the structure of the smart home environment). However, it should be appreciated that smart doorknobs can be provided on external and/or internal doors of the smart home environment.

The smart thermostats, the smart hazard detectors, the smart doorbells, the smart wall switches, the smart wall plugs, the smart entry detectors, the smart doorknobs, the keypads, and other devices of a smart home environment (e.g., as illustrated as sensors 1210 and 1220 of FIG. 12A) can be communicatively coupled to each other via the network 1200, and to the controller 1230 and/or remote system 1240 to provide security, safety, and/or comfort for the smart home environment. Alternatively or in addition, each of the devices of the smart home environment may provide data that can be used to determine an occupancy and/or physical status of a premises, as well as data that may be used to determine an appropriate recipient of a notification, as previously disclosed herein.

A user can interact with one or more of the network-connected smart devices (e.g., via the network 1200). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view, arm or disarm the security system of the home.

One or more users can control one or more of the network-connected smart devices in the smart home environment using a network-connected computer or portable electronic device. In some examples, some or all of the users (e.g., individuals who live in the home) can register their mobile device and/or key FOBs with the smart home environment (e.g., with the controller 1230). Such registration can be made at a central server (e.g., the controller 1230 and/or the remote system 1240) to authenticate the user and/or the electronic device as being associated with the smart home environment, and to provide permission to the user to use the electronic device to control the network-connected smart devices and systems of the smart home environment. A user can use their registered electronic device to remotely control the network-connected smart devices and systems of the smart home environment, such as when the occupant is at work or on vacation. The user may also use their registered electronic device to control the network-connected smart devices when the user is located inside the smart home environment.

Alternatively, or in addition to registering electronic devices, the smart home environment may make inferences about which individuals live in the home (occupants) and are therefore users and which electronic devices are associated with those individuals. As such, the smart home environment may "learn" who is a user (e.g., an authorized user) and permit the electronic devices associated with those individuals to control the network-connected smart devices of the smart home environment (e.g., devices communicatively coupled to the network 1200) in some embodiments, including sensors used by or within the smart home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols. As previously described, such notices may be generated in response to specific determinations of the occupancy and/or physical status of a premises, or they may be sent for other reasons as disclosed herein.

A smart home environment may include communication with devices outside of the smart home environment but within a proximate geographical range of the home. For example, the smart home environment may include an outdoor lighting system (not shown) that communicates information through the communication network 1200 or directly to a central server or cloud-computing system (e.g., controller 1230 and/or remote system 1240) regarding detected movement and/or presence of people, animals, and any other objects and receives back commands for controlling the lighting accordingly.

The controller 1230 and/or remote system 1240 can control the outdoor lighting system based on information received from the other network-connected smart devices in the smart home environment. For example, in the event that any of the network-connected smart devices, such as smart wall plugs located outdoors, detect movement at nighttime, the controller 1230 and/or remote system 1240 can activate the outdoor lighting system and/or other lights in the smart home environment.

Figure 12B:
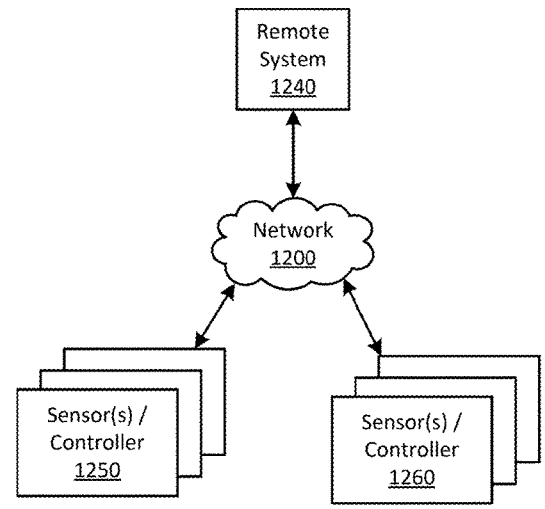
FIG. 12B shows networked sensors according to an embodiment of the disclosed subject matter.

In some configurations, a remote system 1240 may aggregate data from multiple locations, such as multiple buildings, multi-resident buildings, individual residences within a neighborhood, multiple neighborhoods, and the like. In general, multiple sensor/controller systems 1250 and 1260 as shown FIG. 12B may provide information to the remote system 1240. The systems 1250 and 1260 may provide data directly from one or more sensors as previously described, or the data may be aggregated and/or analyzed by local controllers such as the controller 1230, which then communicates with the remote system 1240. The remote system may aggregate and analyze the data from multiple locations, and may provide aggregate results to each location. For example, the remote system 1240 may examine larger regions for common sensor data or trends in sensor data, and provide information on the identified commonality or environmental data trends to each local system 1250 and 1260. Aggregated data may be used to generate appropriate notices and/or determine appropriate recipients for such notices as disclosed herein. For example, the remote system 1240 may determine that the most common user response to a notification that a garage door has been left open while a security component of the smart home environment is in an armed state, is that the user returns to the premises and closes the garage door. Individual smart home systems and/or controllers as previously disclosed may receive such data from the remote system and, in response, set a default action of closing the garage door when the system determines that an armed state has been set and the garage door has been left open for more than a minimum threshold of time. The data provided to the individual systems may be only aggregate data, i.e., such that no individual information about any one other smart home environment or type of smart home environment is provided to any other. As another example, the remote system may receive data from multiple premises in a particular geographic region, indicating that it is raining in the region, and that the rain is moving east (based on the times at which the data indicating rainfall is received from different premises). In response, the remote system may provide an indication to premises further to the east that rain may be expected. In response, notifications may be provided to occupants of the individual premises that rain is expected, that particular windows should be closed, or the like. In some configurations users may be provided with the option of receiving such aggregated data, and/or with the option of providing anonymous data to a remote system for use in such aggregation. In some configurations, aggregated data also may be provided as "historical" data as previously disclosed. Such data may be used by a remote system and/or by individual smart home environments to identify trends, predict physical statuses of a premises, and the like.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 13:
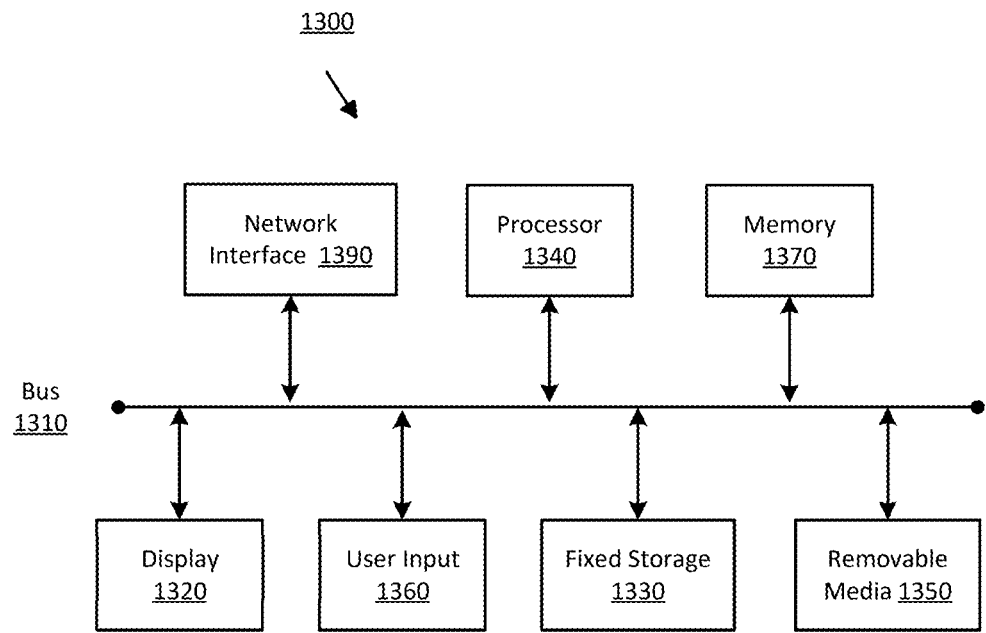
FIG. 13 shows a computing device according to an embodiment of the disclosed subject matter.

Embodiments of the presently disclosed subject matter may be implemented in and used with a variety of computing devices. FIG. 13 is an example of a computing device 1300 suitable for implementing embodiments of the disclosed subject matter. For example, the device 1300 may be used to implement a controller, a device including sensors as disclosed herein, or the like. Alternatively or in addition, the device 1300 may be, for example, a desktop or laptop computer, or a mobile computing device such as a smart phone, tablet, or the like. The device 1300 may include a bus 1310 which interconnects major components of the computer 1300, such as a central processor 1340, a memory 1370 such as Random Access Memory (RAM), Read Only Memory (ROM), flash RAM, or the like, a user display 1320 such as a display screen, a user input interface 1360, which may include one or more controllers and associated user input devices such as a keyboard, mouse, touch screen, and the like, a fixed storage 1330 such as a hard drive, flash storage, and the like, a removable media component 1350 operative to control and receive an optical disk, flash drive, and the like, and a network interface 1390 operable to communicate with one or more remote devices via a suitable network connection.

The bus 1310 allows data communication between the central processor 1340 and one or more memory components 1350 and 1370, which may include RAM, ROM, and other memory, as previously noted. Applications resident with the computer 1300 are generally stored on and accessed via a computer readable storage medium.

The fixed storage 1330 may be integral with the computer 1300 or may be separate and accessed through other interfaces. The network interface 1390 may provide a direct connection to a remote server via a wired or wireless connection. The network interface 1390 may provide such connection using any suitable technique and protocol as will be readily understood by one of skill in the art, including digital cellular telephone, Wi-Fi, Bluetooth®, near-field, and the like. For example, the network interface 1390 may allow the device to communicate with other computers via one or more local, wide-area, or other communication networks, as described in further detail herein.

Figure 14:
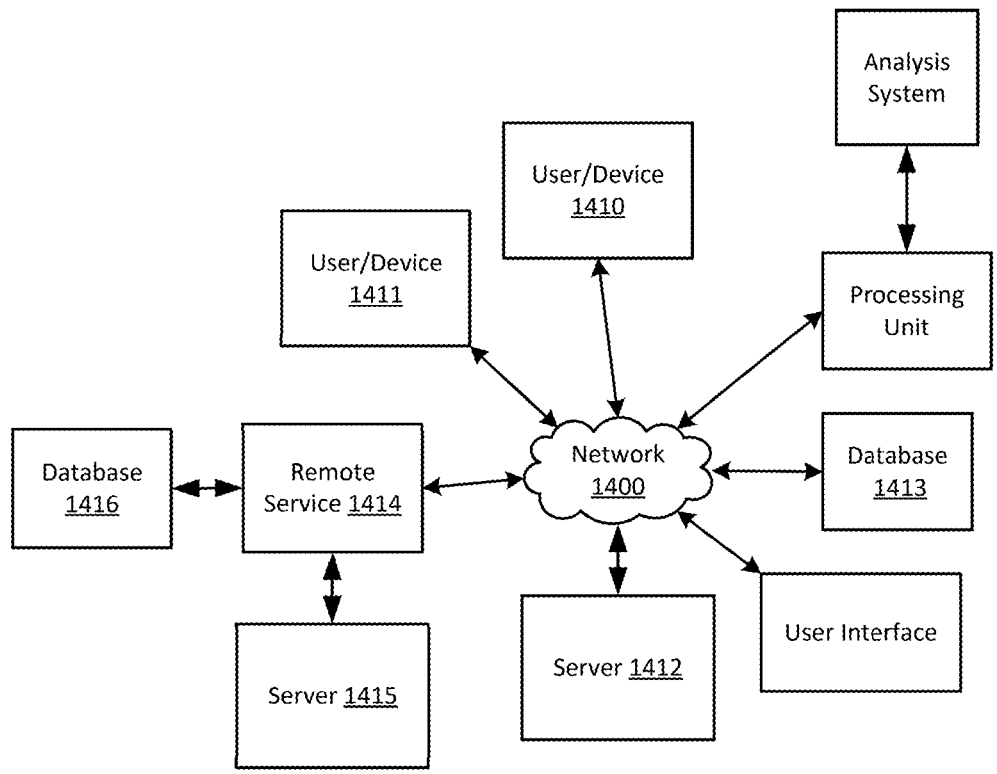
FIG. 14 shows a networked arrangement of devices according to an embodiment of the disclosed subject matter.

FIG. 14 shows an example network arrangement according to an embodiment of the disclosed subject matter. One or more devices 1410 and 1411, such as local computers, smart phones, tablet computing devices, and the like may connect to other devices via one or more networks 1400. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 1412 and/or databases 1413. The remote devices may be directly accessible by the devices 1410 and 1411, or one or more other devices may provide intermediary access such as where a server 1412 provides access to resources stored in a database 1413. The devices 1410 and 1411 also may access remote platforms 1414 or services provided by remote platforms 1414 such as cloud computing arrangements and services. The remote platform 1414 may include one or more servers 1415 and/or databases 1416.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for operating a premises management system, the method comprising:
    capturing, at two or more different sensors communicatively coupled to a device, a sequence of patterns of radiation reflected from a first object in a room over a first period of time, wherein the two or more different sensors are selected from the group consisting of: red-green-blue (RGB) imaging cameras, RGB depth (RGB-D) cameras, complementary metal-oxide semiconductor (CMOS) image sensors, and infrared imaging sensors;
    determining, at a processor communicatively coupled to the device, a sequence of variations between the sequence of patterns of radiation captured by the two or more different sensors and a sequence of patterns of radiation emitted by the device;
    determining, at the processor, a first series of object characteristics of the first object over the first period of time based upon the sequence of variations, the first series of object characteristics comprising a sequence of dimensions of the first object, the sequence of locations of the first object, and depth information of the first object;
    determining, at the processor, the first object is a user based upon comparing the depth information of the first object, the sequence of dimensions of the first object, and a sequence of locations of the first object to a previously captured second series of a second object characteristics comprising depth information of the second object, a sequence of dimensions of the second object and a sequence of locations of the second object stored in a room profile of the room; and
    controlling, at the processor, the premises management system to change a security setting based on the determination that the first object is the user based on the sequence of the dimensions and the sequence of locations of the first object being consistent with the change of the security setting, so that the user can enter the room without the premises management system outputting an alarm.

2. The method of claim 1 wherein the sequence of patterns of radiation reflected from the first object comprises:
    no more than one pattern of radiation reflected from the first object, and
    no more than one instance of the pattern.

3. The method of claim 1 wherein radiation comprises infrared radiation.

4. The method of claim 1 wherein each of the first series of object characteristics of the first object comprises at least one of the group consisting of: an area of the first object, a shape of the first object, a volume of the first object, a color of the first object, a luminosity of the first object, a time of capture of the first series of object characteristics of the first object, a velocity of the first object, and an acceleration of the first object.

5. The method of claim 1 wherein the room profile comprises:
    a sequence of dimensions of an object associated with the user; and
    a sequence of locations of the object associated with the user.

6. The method of claim 1 wherein the room profile comprises a gesture associated with the user.

7. The method of claim 1 wherein the room profile comprises a gait associated with the user.

8. The method of claim 1 wherein the room profile comprises:
    a sequence of dimensions of an object associated with the user, and
    a sequence of locations of the object associated with the user; and
    wherein the determining the first object is the user comprises comparing the determined first series of object characteristics of the first object to the sequence of dimensions of the object associated with the user and to the sequence of locations of the object associated with the user.

9. The method of claim 1 wherein the room profile comprises:
    a three dimensional map of the room generated based on the first and second series of object characteristics determined from one or more captured patterns of radiation emitted from the device and reflected from at least the first and second objects in the room.

10. The method of claim 1 wherein the determining the first object is the user is further based upon a user data.

11. The method of claim 10 wherein the user data comprises at least one of the group consisting of: a geofence boundary indicator data, a global positioning system location data, a Bluetooth low energy (BLE) signal data, a near field communication (NFC) signal data, a cellular signal data, an online status data, a profile status data, a schedule data, a calendar data, a health monitoring data, a biometric voice recognition pattern data, and an audible user password data.

12. The method of claim 1 wherein the determining the first object is the user is further based upon a sequence comprising the determined first series of object characteristics of the first object and a user data.

13. The method of claim 1 wherein the determining the first object is the user is further based upon a premises data.

14. The method of claim 13, wherein the premises data comprises at least one of the group consisting of: an open/close sensor data, a locked/unlocked sensor data, a hazard detection sensor data, a door knob sensor data, and an entry detector sensor data.

15. The method of claim 1 wherein the determining the first object is the user is further based upon a sequence comprising the determined first series of object characteristics of the first object, a user data, and a premises data.

16. The method of claim 1, comprising adjusting a status of the device based upon the user.

17. The method of claim 16, wherein the adjusting the status comprises at least one of the group consisting of: activating a light indicator, enabling access to a user interface, activating a user interface, restricting access to the device, changing a temperature setting, changing a lighting setting, changing a security setting, increasing a time period, and disabling an alarm.

18. The method of claim 1, comprising:
   determining a condition of the user based upon the determined first series of object characteristics of the first object and the room profile; and
   adjusting a status of the device based upon the determined condition of the user.

19. The method of claim 18, wherein the determined condition of the user comprises at least one of the group consisting of: the user is limping, the user is carrying another object with two hands, the user is traveling slower than normal; the user is using crutches; the user is in a wheel chair, the user has collapsed, and the user is asleep.

20. The method of claim 1 comprising updating the room profile to comprise the determined first series of object characteristics of the first object.

21. The method of claim 1, further comprising:
   determining a third series of object characteristics of a third object over the first period of time based upon the sequence of variations;
   comparing the third series of object characteristics to a fourth series of object characteristics stored in the room profile for the room, the fourth series of object characteristics determined of a fourth object in the room over a second period of time, wherein:
     the second period of time is prior to the first period of time, and
     the determination that the first object is the user is further based on the comparison of the third series of object characteristics of the third object to the fourth series object characteristics of the fourth object.

22. The method of claim 21, wherein the second series of object characteristics of the second object and the fourth series of object characteristics of the fourth object are components of a set of object characteristics associated with the user.

* * * * *